US012634062B2

(12) United States Patent
Kim et al.

(10) Patent No.: US 12,634,062 B2
(45) Date of Patent: May 19, 2026

(54) STATION AND ACCESS POINT PERFORMING WLAN-BASED COMMUNICATION, AND OPERATION METHODS THEREOF

(71) Applicant: SAMSUNG ELECTRONICS CO., LTD., Suwon-si (KR)

(72) Inventors: Jinmin Kim, Suwon-si (KR); Wookbong Lee, Suwon-si (KR); Youngwook Son, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 420 days.

(21) Appl. No.: 18/058,898

(22) Filed: Nov. 28, 2022

(65) Prior Publication Data

US 2023/0171052 A1 Jun. 1, 2023

Related U.S. Application Data

(60) Provisional application No. 63/265,946, filed on Dec. 23, 2021, provisional application No. 63/283,345, filed on Nov. 26, 2021.

(30) Foreign Application Priority Data

Jul. 12, 2022 (KR) ........................ 10-2022-0085874

(51) Int. Cl.
*H04L 5/00* (2006.01)
*H04L 1/00* (2006.01)
(Continued)

(52) U.S. Cl.
CPC .......... *H04L 5/0044* (2013.01); *H04L 1/0003* (2013.01); *H04W 72/0453* (2013.01); *H04W 84/12* (2013.01)

(58) Field of Classification Search
CPC ..... H04L 5/0044; H04L 1/0003; H04L 5/003; H04L 1/0031; H04L 1/0009;
(Continued)

(56) References Cited

U.S. PATENT DOCUMENTS 10,129,060 B2 * 11/2018 Jones, IV ........... H04L 27/2601
10,555,245 B2 2/2020 Chu et al.
(Continued)

FOREIGN PATENT DOCUMENTS

| CN | 116888933 A | * | 10/2023 | ........... H04B 7/0417 |
| TW | 201616826 A | | 5/2016 | |
| TW | 202110265 A | | 3/2021 | |

OTHER PUBLICATIONS

Extended European Search Report dated Apr. 4, 2023 in corresponding European Application No. 22209715.6 (9 pages).
(Continued)

*Primary Examiner* — Jay P Patel
(74) *Attorney, Agent, or Firm* — Morgan, Lewis & Bockius LLP

(57) ABSTRACT

A station (STA) that communicates with an access point (AP) in a Wireless Local Area Network (WLAN) system includes a transceiver configured to support transmission and reception of signals within at least a first bandwidth and to receive a first physical layer protocol data unit (PPDU) conforming to a second bandwidth greater than the first bandwidth, and processing circuitry configured to support a wider bandwidth than the first bandwidth by obtaining a second PPDU allocated to the STA within the first bandwidth from the first PPDU. The processing circuitry is configured to control the transceiver to transmit, to the AP, performance information indicating first modulation and
(Continued)

coding schemes (MCSs) supportable in the wider bandwidth according to a capability of the STA, among a plurality of candidate MCSs.

15 Claims, 32 Drawing Sheets

(51) Int. Cl.
   *H04W 72/0453*       (2023.01)
   *H04W 84/12*         (2009.01)

(58) Field of Classification Search
   CPC ............. H04L 1/0017; H04L 27/2601; H04W 72/0453; H04W 84/12; H04W 8/24
   See application file for complete search history.

(56) References Cited

U.S. PATENT DOCUMENTS

| | | | | |
|---|---|---|---|---|
| 10,764,005 | B2 | 9/2020 | Choi et al. | |
| 2008/0076365 | A1 | 3/2008 | Adireddy et al. | |
| 2015/0365203 | A1 | 12/2015 | Suh et al. | |
| 2019/0191331 | A1* | 6/2019 | Park | H04L 27/18 |
| 2019/0305996 | A1* | 10/2019 | Handte | H04L 1/0009 |
| 2019/0327740 | A1 | 10/2019 | Verma et al. | |
| 2020/0154347 | A1* | 5/2020 | Abouelseoud | H04W 8/005 |
| 2020/0204975 | A1* | 6/2020 | Abouelseoud | H04W 16/28 |
| 2020/0218531 | A1 | 7/2020 | Kushwaha et al. | |
| 2021/0203435 | A1* | 7/2021 | Cariou | H04L 1/0002 |
| 2021/0204315 | A1 | 7/2021 | Chu et al. | |
| 2021/0212035 | A1 | 7/2021 | Son et al. | |
| 2021/0218531 | A1 | 7/2021 | Ouchi | |
| 2021/0288768 | A1 | 9/2021 | Yang et al. | |
| 2021/0289347 | A1 | 9/2021 | Chu et al. | |
| 2021/0329637 | A1 | 10/2021 | Chen et al. | |
| 2021/0337564 | A1 | 10/2021 | Kwon et al. | |
| 2021/0385688 | A1 | 12/2021 | Liu et al. | |
| 2021/0391961 | A1 | 12/2021 | Cao et al. | |
| 2021/0399864 | A1 | 12/2021 | Lim et al. | |
| 2022/0329471 | A1* | 10/2022 | Lim | H04L 27/2603 |
| 2024/0333465 | A1* | 10/2024 | Lou | H04L 5/0055 |

OTHER PUBLICATIONS

Khorov, et al., "Current Status and Directions of IEEE 802.11be, the Future Wi-Fi 7", IEEE Access, Digital Object Identifier 10.II 09/ACCESS.2020.2993448, vol. 8, 2020, pp. 88664-88688.

Kim, et al, "Wider-Bandwidth Operation of IEEE 802.11 for Extremely High Throughput: Challenges and Solutions for Flexible Puncturing", IEEE Access, Digital Object Identifier 10.II09/ACCESS.2020. 3040429, vol. 8, 2020, pp. 213840-213853.

Chauhan, et al., "IEEE 802.11be: A Review on Wi-Fi 7 Use Cases", W21 9th International Conference on Reliability, ! nfocom Technologies and Optimization (Trends and Future Directions) (JCRJTO) Amity University, Noida, India. Sep. 3-4, 2021, 7 pages.

First Office Action issued Jan. 7, 2026 in corresponding Taiwanese Patent Application No. 111145180.

* cited by examiner

| Element | Length | Element ID Extension | EHT MAC Capabilities Information | EHT PHY Capabilities Information | Supported EHT-MCS And NSS Set | EHT PPE Thresholds (Optional) |
|---------|--------|----------------------|--------------------------------|--------------------------------|-------------------------------|-------------------------------|
| Octets: 1 | 1 | 1 | 2 | variable | variable | variable |

FIG. 5B

| B0 | B1 | B2 | B3 | B4 | B5 |
|---|---|---|---|---|---|
| Reserved | Support for 320 MHz In 6 GHz | Support for 242-tone RU in BW Wider Than 20 MHz | NDP With 4x EHT-LTF And 3.2 µs GI | Partial Bandwidth UL MU-MIMO | SU Beamformer |
| Bits: 1 | 1 | 1 | 1 | 1 | 1 |

| B6 | B7　　　B9 | B10　　　B12 | B13　　　B15 | B16　　　B18 | B19　　　B21 |
|---|---|---|---|---|---|
| SU Beamformee | Beamformee SS (≤ 80 MHz) | Beamformee SS (= 160 MHz) | Beamformee SS (= 320 MHz) | Number Of Sounding Dimensions (≤ 80 MHz) | Number Of Sounding Dimensions (= 160 MHz) |
| Bits: 1 | 3 | 3 | 3 | 3 | 3 |

| B22　　　B24 | B25 | B26 | B27 | B28 | B29 |
|---|---|---|---|---|---|
| Number Of Sounding Dimensions (= 320 MHz) | Ng = 16 SU Feedback | Ng = 16 MU Feedback | Codebook Size (φ,ψ) = {4, 2} SU Feedback | Codebook Size (φ,ψ) = {7, 5} MU Feedback | Triggered SU Beamforming Feedback |
| Bits: 3 | 1 | 1 | 1 | 1 | 1 |

| B30 | B31 | B32 | B33 | B34 | B35 |
|---|---|---|---|---|---|
| Triggered MU Beamforming Partial BW Feedback | Triggered CQI Feedback | Partial Bandwidth DL MU-MIMO | PSR-Based SR Support | Power Boost Factor Support | EHT MU PPDU With 4x EHT-LTF And 0.8 µs GI |
| Bits: 1 | 1 | 1 | 1 | 1 | 1 |

| B36　　　B39 | B40 | B41 | B42 | B43 | B44　　　B45 |
|---|---|---|---|---|---|
| Max Nc | Non-Triggered CQI Feedback | Tx 1024-QAM And 4096-QAM < 242-tone RU Support | Rx 1024-QAM And 4096-QAM < 242-tone RU Support | PPE Thresholds Present | Common Nominal Packet Padding |
| Bits: 4 | 1 | 1 | 1 | 1 | 2 |

| B46　　　B50 | B51　　　B54 | B55 | B56 | B57 | B58 |
|---|---|---|---|---|---|
| Maximum Number of Supported EHT-LTFs | Support of MCS 15 | Support of EHT DUP In 6 GHz | Support For 20 MHz Operating STA Receiving NDP With Wider Bandwidth | Non-OFDMA UL MU-MIMO (BW ≤ 80 MHz) | Non-OFDMA UL MU-MIMO (BW =160 MHz) |
| Bits: 5 | 4 | 1 | 1 | 1 | 1 |

| B59 | B60 | B61 | B62 | B63_1　　　B63_n |
|---|---|---|---|---|
| Non-OFDMA UL MU-MIMO (BW =320 MHz) | MU Beamformer (BW ≤ 80 MHz) | MU Beamformer (BW =160 MHz) | MU Beamformer (BW =320 MHz) | Wider BW Support |
| Bits: 1 | 1 | 1 | 1 | n |

FIG. 5C

Using for including Wider BW Support

| B0 | B1 | B2 | B3 | B4 | B5 |
|---|---|---|---|---|---|
| Reserved | Support for 320 MHz In 6 GHz | Support for 242-tone RU in BW Wider Than 20 MHz | NDP With 4x EHT-LTF And 3.2 µs GI | Partial Bandwidth UL MU-MIMO | SU Beamformer |
| Bits: 1 | 1 | 1 | 1 | 1 | 1 |

| B6 | B7 B9 | B10 B12 | B13 B15 | B16 B18 | B19 B21 |
|---|---|---|---|---|---|
| SU Beamformee | Beamformee SS (≤ 80 MHz) | Beamformee SS (= 160 MHz) | Beamformee SS (= 320 MHz) | Number Of Sounding Dimensions (≤ 80 MHz) | Number Of Sounding Dimensions (= 160 MHz) |
| Bits: 1 | 3 | 3 | 3 | 3 | 3 |

| B22 B24 | B25 | B26 | B27 | B28 | B29 |
|---|---|---|---|---|---|
| Number Of Sounding Dimensions (= 320 MHz) | Ng = 16 SU Feedback | Ng = 16 MU Feedback | Codebook Size (Φ,ψ) = {4, 2} SU Feedback | Codebook Size (Φ,ψ) = {7, 5} MU Feedback | Triggered SU Beamforming Feedback |
| Bits: 3 | 1 | 1 | 1 | 1 | 1 |

| B30 | B31 | B32 | B33 | B34 | B35 |
|---|---|---|---|---|---|
| Triggered MU Beamforming Partial BW Feedback | Triggered CQI Feedback | Partial Bandwidth DL MU-MIMO | PSR-Based SR Support | Power Boost Factor Support | EHT MU PPDU With 4x EHT-LTF And 0.8 µs GI |
| Bits: 1 | 1 | 1 | 1 | 1 | 1 |

| B36 B39 | B40 | B41 | B42 | B43 | B44 B45 |
|---|---|---|---|---|---|
| Max Nc | Non-Triggered CQI Feedback | Tx 1024-QAM And 4096-QAM < 242-tone RU Support | Rx 1024-QAM And 4096-QAM < 242-tone RU Support | PPE Thresholds Present | Common Nominal Packet Padding |
| Bits: 4 | 1 | 1 | 1 | 1 | 2 |

| B46 B50 | B51 B54 | B55 | B56 | B57 | B58 |
|---|---|---|---|---|---|
| Maximum Number of Supported EHT-LTFs | Support of MCS 15 | Support of EHT DUP In 6 GHz | Support For 20 MHz Operating STA Receiving NDP With Wider Bandwidth | Non-OFDMA UL MU-MIMO (BW ≤ 80 MHz) | Non-OFDMA UL MU-MIMO (BW =160 MHz) |
| Bits: 5 | 4 | 1 | 1 | 1 | 1 |

| B59 | B60 | B61 | B62 | B63 |
|---|---|---|---|---|
| Non-OFDMA UL MU-MIMO (BW =320 MHz) | MU Beamformer (BW ≤ 80 MHz) | MU Beamformer (BW =160 MHz) | MU Beamformer (BW =320 MHz) | Reserved |
| Bits: 1 | 1 | 1 | 1 | 1 |

FIG. 7B

| MCS Index | Modulation | Coding |
|:---:|:---:|:---:|
| 14 | BPSK-DCM-DUP | 1/2 |
| 15 | BPSK-DCM | 1/2 |
| 0 | BPSK | 1/2 |
| 1 | QPSK | 1/2 |
| 2 | QPSK | 3/4 |
| 3 | 16-QAM | 1/2 |
| 4 | 16-QAM | 3/4 |
| 5 | 64-QAM | 2/3 |
| 6 | 64-QAM | 3/4 |
| 7 | 64-QAM | 5/6 |
| 8 | 256-QAM | 3/4 |
| 9 | 256-QAM | 5/6 |
| 10 | 1024-QAM | 3/4 |
| 11 | 1024-QAM | 5/6 |
| 12 | 4096-QAM | 3/4 |
| 13 | 4096-QAM | 5/6 |

Direction of Increasing Data Rate

FIG. 8A

| B63_1 | B63_2 |
|---|---|
| MCS12<br>For Wider BW Support | MCS13<br>For Wider BW Support |
| 1 BIT | 1 BIT |

FIG. 8B

| MCS Index | Modulation | Coding |
|-----------|------------|--------|
| 14 | BPSK-DCM-DUP | 1/2 |
| 15 | BPSK-DCM | 1/2 |
| 0 | BPSK | 1/2 |
| 1 | QPSK | 1/2 |
| 2 | QPSK | 3/4 |
| 3 | 16-QAM | 1/2 |
| 4 | 16-QAM | 3/4 |
| 5 | 64-QAM | 2/3 |
| 6 | 64-QAM | 3/4 |
| 7 | 64-QAM | 5/6 |
| 8 | 256-QAM | 3/4 |
| 9 | 256-QAM | 5/6 |
| 10 | 1024-QAM | 3/4 |
| 11 | 1024-QAM | 5/6 |
| 12 | 4096-QAM | 3/4 |
| 13 | 4096-QAM | 5/6 |

Supported by STA

Optionally supported according to STA performance

| Max MCS For Wider BW Support |
|---|

4 BITS

FIG. 9B

| MCS Index | Modulation | Coding |
|:---:|:---:|:---:|
| 14 | BPSK−DCM−DUP | 1/2 |
| 15 | BPSK−DCM | 1/2 |
| 0 | BPSK | 1/2 |
| 1 | QPSK | 1/2 |
| 2 | QPSK | 3/4 |
| 3 | 16−QAM | 1/2 |
| 4 | 16−QAM | 3/4 |
| 5 | 64−QAM | 2/3 |
| 6 | 64−QAM | 3/4 |
| 7 | 64−QAM | 5/6 |
| 8 | 256−QAM | 3/4 |
| 9 | 256−QAM | 5/6 |
| 10 | 1024−QAM | 3/4 |
| 11 | 1024−QAM | 5/6 |
| 12 | 4096−QAM | 3/4 |
| 13 | 4096−QAM | 5/6 |

Max MCS → 11

Supportable

Unsupportable

Relative MCS
For Wider BW Support

2 BITS

FIG. 10B

| MCS Index | Modulation | Coding |
|:---:|:---:|:---:|
| 14 | BPSK–DCM–DUP | 1/2 |
| 15 | BPSK–DCM | 1/2 |
| 0 | BPSK | 1/2 |
| 1 | QPSK | 1/2 |
| 2 | QPSK | 3/4 |
| 3 | 16–QAM | 1/2 |
| 4 | 16–QAM | 3/4 |
| 5 | 64–QAM | 2/3 |
| 6 | 64–QAM | 3/4 |
| 7 | 64–QAM | 5/6 |
| 8 | 256–QAM | 3/4 |
| 9 | 256–QAM | 5/6 |
| 10 | 1024–QAM | 3/4 |
| 11 | 1024–QAM | 5/6 |
| 12 | 4096–QAM | 3/4 |
| 13 | 4096–QAM | 5/6 |

Supportable

Unsupportable

Max MCS

OFFSET

Max MCS
For Normal BW

FIG.  11A

| B63_1 | B63_2 | B63_3 | B63_4 |
|---|---|---|---|
| Relative MCS For Wider BW Support In 160 MHz | | Relative MCS For Wider BW Support In 320 MHz | |
| 2 BITS | | 2 BITS | |

FIG. 11B

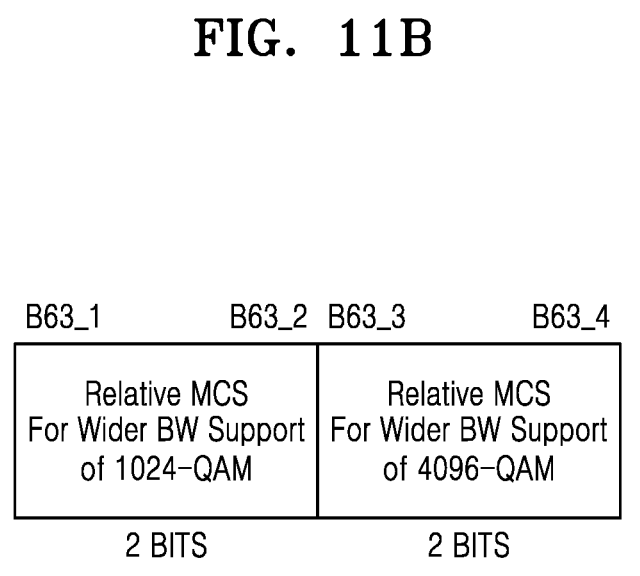

| B63_1 | B63_2 | B63_3 | B63_4 |
|---|---|---|---|
| Relative MCS For Wider BW Support of 1024-QAM | | Relative MCS For Wider BW Support of 4096-QAM | |
| 2 BITS | | 2 BITS | |

FIG. 11C

| B63_1 | B63_2 B63_3 | B63_4 B63_5 | B63_6 B63_7 | B63_8 |
|---|---|---|---|---|
| | Relative MCS For Wider BW Support of 1024-QAM In 160 MHz | Relative MCS For Wider BW Support of 4096-QAM In 160 MHz | Relative MCS For Wider BW Support of 1024-QAM In 320 MHz | Relative MCS For Wider BW Support of 4096-QAM In 320 MHz |
| | 2 BITS | 2 BITS | 2 BITS | 2 BITS |

S110(Fig.6)

APPLY FIRST PERFORMANCE INFORMATION
TO INFORMATION RELATED TO MAXIMUM
NUMBER OF SPATIAL STREAMS FOR EACH MCS — S121a

IDENTIFY FIRST MCSs SUPPORTABLE BY STA — S122a

SELECT ONE OF FIRST MCSs — S123a

S130(Fig.6)

Supported EHT-MCS And NSS Set

FIG. 13B

| Max Nss subfield value | Maximum number of spatial streams that supports the specified MCS set |
|---|---|
| 0 | Not supported |
| 1 | 1 |
| 2 | 2 |
| 3 | 3 |
| 4 | 4 |
| 5 | 5 |
| 6 | 6 |
| 7 | 7 |
| 8 | 8 |
| 9-15 | Reserved |

FIG. 13C

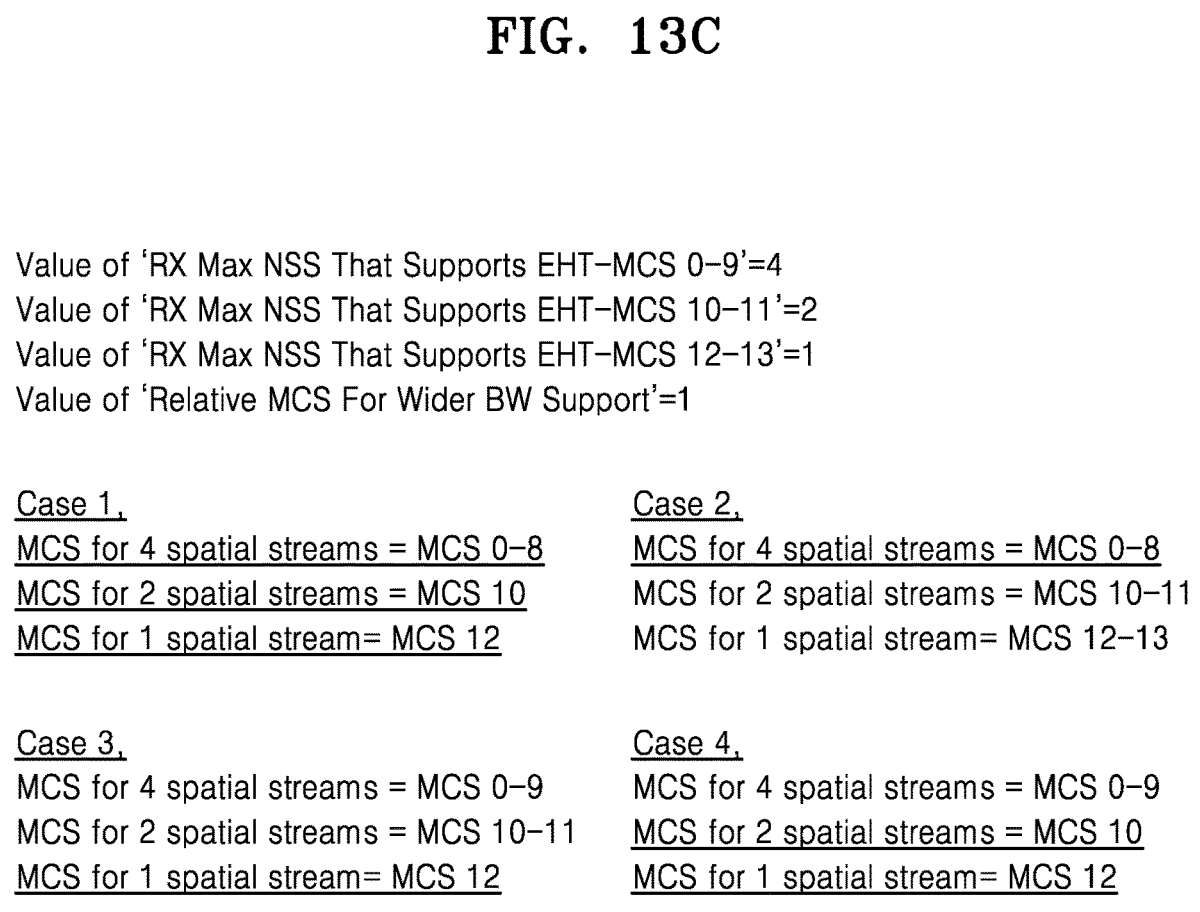

Value of 'RX Max NSS That Supports EHT-MCS 0-9'=4
Value of 'RX Max NSS That Supports EHT-MCS 10-11'=2
Value of 'RX Max NSS That Supports EHT-MCS 12-13'=1
Value of 'Relative MCS For Wider BW Support'=1

Case 1,
MCS for 4 spatial streams = MCS 0-8
MCS for 2 spatial streams = MCS 10
MCS for 1 spatial stream= MCS 12

Case 2,
MCS for 4 spatial streams = MCS 0-8
MCS for 2 spatial streams = MCS 10-11
MCS for 1 spatial stream= MCS 12-13

Case 3,
MCS for 4 spatial streams = MCS 0-9
MCS for 2 spatial streams = MCS 10-11
MCS for 1 spatial stream= MCS 12

Case 4,
MCS for 4 spatial streams = MCS 0-9
MCS for 2 spatial streams = MCS 10
MCS for 1 spatial stream= MCS 12

S110(Fig.6)

APPLY FIRST PERFORMANCE INFORMATION TO INFORMATION RELATED TO MINIMALLY REQUIRED ADJACENT CHANNEL REJECTION LEVELS — S121b

IDENTIFY FIRST MCSs SUPPORTABLE BY STA — S122b

SELECT ONE OF FIRST MCSs — S123b

ACI Rejection
Capability m BITS

FIG. 16B

| MCS Index | Modulation | Rate (R) | Adjacent channel rejection (dB) 20/40/80/160/320 MHz channel | Nonadjacent channel rejection (dB) 20/40/80/160/320 MHz channel |
|---|---|---|---|---|
| 14 | BPSK-DCM-DUP | 1/2 | 16 | 32 |
| 15 | BPSK-DCM | 1/2 | 16 | 32 |
| 0 | BPSK | 1/2 | 16 | 32 |
| 1 | QPSK | 1/2 | 13 | 29 |
| 2 | QPSK | 3/4 | 11 | 27 |
| 3 | 16-QAM | 1/2 | 8 | 24 |
| 4 | 16-QAM | 3/4 | 4 | 20 |
| 5 | 64-QAM | 2/3 | 0 | 16 |
| 6 | 64-QAM | 3/4 | −1 | 15 |
| 7 | 64-QAM | 5/6 | −2 | 14 |
| 8 | 256-QAM | 3/4 | −7 | 9 |
| 9 | 256-QAM | 5/6 | −9 | 7 |
| 10 | 1024-QAM | 3/4 | −12 | 4 |
| 11 | 1024-QAM | 5/6 | −14 | 2 |
| 12 | 4096-QAM | 3/4 | −17 | −1 |
| 13 | 4096-QAM | 5/6 | −20 | −4 |

Supportable

Unsupportable increased by STA performance

STATION AND ACCESS POINT PERFORMING WLAN-BASED COMMUNICATION, AND OPERATION METHODS THEREOF

CROSS-REFERENCE TO RELATED APPLICATIONS

This application is based on and claims priority under 35 U.S.C. § 119 to U.S. Provisional Patent Application No. 63/283,345, filed on Nov. 26, 2021, U.S. Provisional Patent Application No. 63/265,946, filed on Dec. 23, 2021, in the U.S. Patent and Trademark Office, and Korean Patent Application No. 10-2022-0085874, filed on Jul. 12, 2022, in the Korean Intellectual Property Office, the disclosures of which are incorporated by reference herein in their entireties.

TECHNICAL FIELD

This disclosure relates generally to wireless communication, and more particularly, to a station and an access point both performing wireless local area network (WLAN)-based communication, and operation methods thereof.

DISCUSSION OF RELATED ART

In the physical (PHY) layer of a next-generation WLAN succeeding the Institute for Electrical and Electronic Engineers (IEEE) 811.ax compliant WLAN, various technologies have been proposed to improve frequency spectrum efficiency and throughput. For example, a wider bandwidth (e.g., a bandwidth of 320 MHz) to increase data transmission rates, and a multi-resource unit (RU) allocation technique of bundling and transmitting RUs to increase the efficiency of a frequency spectrum have been proposed.

For instance, when the bandwidth of a physical packet data unit (PPDU) transmitted by a legacy WLAN-based communication system ("legacy" with respect to enhancements described herein) and the bandwidth supportable by a station (STA) are the same, an access point (AP) supports multiple accesses. In a proposed update to legacy systems, when the bandwidth of a PPDU transmitted by an AP exceeds the bandwidth supportable by a STA, the STA may obtain a PPDU allocated to itself (e.g., a sub-PPDU) from the received PPDU, thereby increasing the frequency spectrum efficiency. The STA performing the above operation may be defined as supporting a wider bandwidth. Research is ongoing to improve efficiency and performance of STAs when supporting a wider bandwidth.

SUMMARY

Embodiments of the inventive concept provide a station (STA) and an access point (AP) in a WLAN system in which the STA transmits performance information (capability information) to the AP in a wider bandwidth than that defined in a legacy WLAN protocol. Further, the AP generates a PPDU suitable for the STA, based on the performance information of the STA, and transmits the PPDU to the STA. Operation methods of the STA and the AP are described.

According to an aspect of the inventive concept, there is provided a STA that communicates with an AP in a WLAN system, the STA including a transceiver configured to support transmission and reception of signals within at least a first bandwidth and receive a first PPDU conforming to a second bandwidth greater than the first bandwidth, and processing circuitry configured to support a wider bandwidth than the first bandwidth by obtaining a second PPDU allocated to the STA within the first bandwidth from the first PPDU. The processing circuitry is configured to control the transceiver to transmit, to the AP, performance information indicating first modulation and coding schemes (MCSs) supportable in the wider bandwidth according to the capability of the STA, among a plurality of candidate MCSs.

According to another aspect of the inventive concept, there is provided an AP for communicating with a STA that supports transmission and reception within at least a first bandwidth defined by a legacy WLAN protocol in a WLAN system, the AP including a transceiver configured to receive, from the STA, performance information indicating one or more MCSs, among candidate MCSs, supportable by the STA in a second bandwidth wider than the first bandwidth, and transmit a first PPDU to the STA, and processing circuitry configured to select one MCS from the one or more MCSs, based on the performance information and a channel state with the STA, and generate a second PPDU, based on the selected one MCS. The first PPDU includes the second PPDU and conforms to the second bandwidth.

According to another aspect of the inventive concept, there is provided an operation method of a STA for communicating with an AP in a WLAN system, the operation method including transmitting, to the AP, performance information indicating one or more MCSs supportable in a second bandwidth according to a capability of the STA among a plurality of candidate MCSs, where the second bandwidth is wider than a first bandwidth defined by a legacy WLAN protocol; receiving, from the AP, a first PPDU to which an MCS conforming to the second bandwidth and conforming to the performance information, among the one or more MCSs has been applied, and obtaining a second PPDU allocated to the STA from the first PPDU. The second PPDU may be allocated to the STA within the first bandwidth.

According to another aspect of the inventive concept, there is provided an operation method of an AP for communicating with a STA in a WLAN system, the operation method including receiving, from the STA, performance information indicating first MCSs supportable in a wider bandwidth according to the performance of the STA among a plurality of MCSs, selecting one first MCS from the first MCSs, based on the performance information and a channel state with the STA; generating a second PPDU conforming to a first bandwidth, based on the selected first MCS, and transmitting, to the STA, a first PPDU including the second PPDU and conforming to a second bandwidth greater than the first bandwidth.

In another aspect, a STA that communicates with an AP in a WLAN system includes a transceiver and processing circuitry. The transceiver is configured to support transmission and reception of signals within at least a first bandwidth defined by a legacy WLAN protocol and to receive a first PPDU conforming to a second bandwidth greater than the first bandwidth. The processing circuitry is configured to support the second bandwidth by: controlling the transceiver to transmit, to the AP, performance information indicating one or more MCSs, among a plurality of candidate MCSs, where the one or more MCSs are supportable by the STA in the second bandwidth according to a capability of the STA. The processing circuitry obtains a second PPDU from the first PPDU, where the second PPDU is allocated to the STA and configured by the AP based at least on the performance information transmitted by the transceiver.

In another aspect, a computer program product is used in any of the above-summarized STAs and includes a non-transitory computer-accessible storage medium, which includes code to implement the operating method of the STA.

BRIEF DESCRIPTION OF THE DRAWINGS

Embodiments will be more clearly understood from the following detailed description taken in conjunction with the accompanying drawings in which:

FIGS. 3A and 3B are block diagrams for explaining an operation of a wireless communication system according to an embodiment;

FIG. 5A is a view illustrating an enhancement for extremely high throughput (EHT) capabilities element format for transmitting performance information according to an embodiment, and FIGS. 5B and 5C are views illustrating 'EHT PHY Capabilities Information' fields for transmitting performance information according to an embodiment;

FIG. 7B is a view for explaining the performance of a STA indicated by the first performance information of FIG. 7A;

FIG. 8A is a view illustrating first performance information according to an embodiment, and FIG. 8B is a view for explaining the performance of a STA indicated by the first performance information of FIG. 8A;

FIG. 9A is a view illustrating first performance information according to an embodiment, and FIG. 9B is a view for explaining the performance of a STA indicated by the first performance information of FIG. 9A;

FIG. 10A is a view illustrating first performance information according to an embodiment, and FIG. 10B is a view for explaining the performance of a STA indicated by the first performance information of FIG. 10A;

FIGS. 11A, 11B and 11C are views illustrating first performance information according to an embodiment;

FIGS. 13B and 13C are views for explaining the performance of a STA indicated by the first performance information;

FIG. 16A is a view illustrating first performance information according to an embodiment, and FIG. 16B is a view for explaining the performance of a STA indicated by the first performance information of FIG. 16A;

DETAILED DESCRIPTION OF EMBODIMENTS

Embodiments will now be described in the context of a wireless communication system based on a wireless local area network (WLAN). However, the inventive concept may be applied to other wireless communication systems, e.g., cellular communication systems such as next-generation communication, new radio (NR), long term evolution (LTE), LTE-advanced (LTE-A), wireless broadband (WiBro), or global system for mobile communication (GSM), 5G and 6G, or local area communication systems such as Bluetooth or near field communication (NFC)), which have similar technical aspects or channel configurations.

Herein, "performance information" of a STA may refer to information related to the STA's capability to communicate with an AP. One example of performance information (herein, sometimes called "first performance information") is an indication of MCSs that the STA is capable of using to successfully communicate over a predetermined wide bandwidth, which is wider than a bandwidth prescribed by a legacy WLAN protocol.

Herein, the term "normal bandwidth" may refer to a bandwidth prescribed by a legacy WLAN protocol, such as the 802.11ax protocol.

Figure 1:
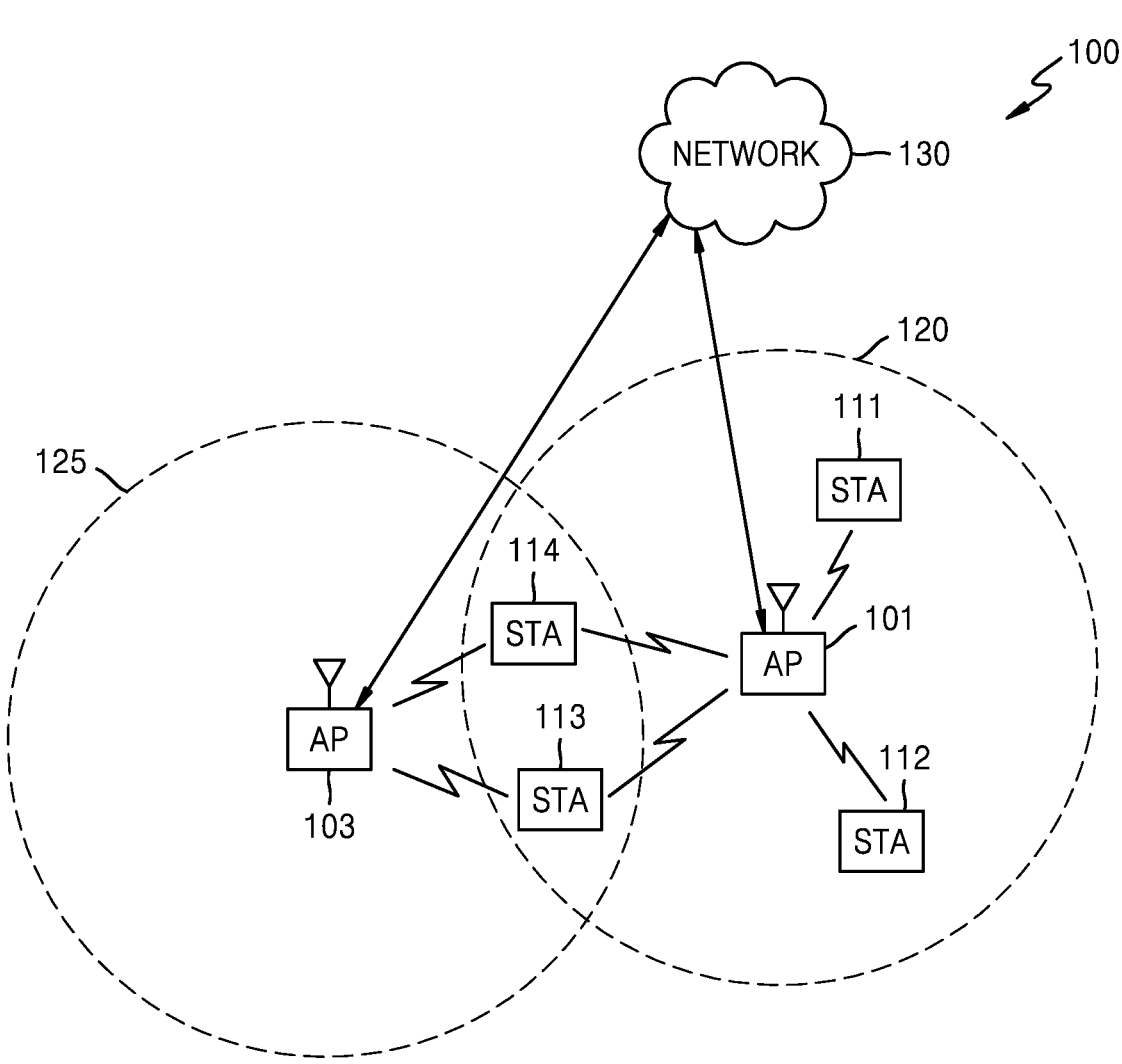
FIG. 1 is a block diagram of a wireless communication system according to an embodiment.

FIG. 1 is a block diagram illustrating a wireless communication system 100 according to an embodiment. The wireless communication system 100 may include a plurality of access points (APs) 101 and 103 and a plurality of stations (STAs) 111 through 114. The APs 101 and 103 may communicate with at least one network 130, such as the Internet or an Internet protocol (IP) network.

The APs 101 and 103 may provide wireless connection to the network 130 so that the STAs 111 through 114 within respective coverage areas 120 and 125 of the APs 101 and 103 may use a communication service. For example, the APs 101 and 103 may mutually communicate with each other using wireless fidelity (WiFi) or other WLAN communication techniques. The APs 101 and 103 may communicate with the STAs 111 through 114 by using WiFi or other WLAN communication techniques.

For reference, depending on a network type, other well-known terms such as a "router" and a "gateway" may be substituted for an AP. An AP in a WLAN may be provided for a wireless channel. The AP may be identified as a STA for communication with another AP according to an operation. An AP according to the inventive concept may also be referred to as a device, a wireless device, a communication device, or the like.

In addition, depending on a network type, a STA may be used in place of another well-known term such as a mobile station, a subscriber station, a remote terminal, user equipment, a wireless terminal, a user device, or a user. For convenience, the acronym "STA" used herein is used to denote a remote wireless device that accesses an AP wirelessly or accesses a wireless channel within a WLAN. The STA may be identified as an AP for another STA side according to an operation. A STA according to the inventive concept may also be referred to as a device, a wireless device, a communication device, or the like.

According to an embodiment, the APs 101 and 103 may be included in different devices, respectively, or may be included in one device (AP multiple link device (MLD)). The STAs 111 through 114 may be included in different devices, respectively, or may be included in one device (non-AP MLD).

Dashed lines show approximate extents of the coverage areas 120 and 125. The coverage areas 120 and 125 are shown as generally circular for purposes of explanation and illustration. However, the coverage areas 120 and 125 associated with the APs 101 and 103 may have different shape reflecting various changes in a wireless environment related to natural or artificial obstruction, or may have other shapes including irregular shapes, depending on the settings of the APs 101 and 103.

FIG. 1 only shows an example of the wireless communication system 100, but embodiments are not limited thereto.

For example, the wireless communication system 100 may include an arbitrary number of APs and an arbitrary number of STAs both arbitrarily suitably arranged. The AP 101 may directly communicate with the arbitrary number of STAs. In detail, the AP 101 may provide a wireless broadband connection with the network 130 to the STAs 111 through 114.

Likewise, each of the APs 101 and 103 may directly communicate with the network 130, and may provide wireless broadband connections with the STAs 111 through 114 to the network 130. In addition, the APs 101 and 103 may implement connections with various external networks, such as an external telephone network or a data network. Respective configurations and operations of the AP 101 and the STA 111 are mainly described in order to describe embodiments, and the embodiments to be described are applicable to the other AP 103 and the other STAs 112 through 114.

According to an embodiment, the STA 111 may transmit its own performance information for supporting a wider ("second") bandwidth than a legacy WLAN protocol bandwidth (a "first bandwidth") to the AP 101 to perform enhanced WLAN-based communication (enhanced in relation to that of the legacy WLAN protocol). Here, "legacy" refers to a previously deployed technology such as the IEEE 802.11ax standard (protocol). Herein, a STA supporting the wider (second) bandwidth may refer to the STA being capable of obtaining a second physical packet data unit (PPDU) allocated to itself from a first PPDU conforming to the second bandwidth, in response to the first PPDU.

Herein, the first PPDU refers to a PPDU conforming to the second bandwidth during transmission and reception of signals, and the second PPDU refers to a PPDU allocated to the STA within the first PPDU. The first PPDU may further include at least one of the PPDUs respectively allocated to the other STAs 112 through 114.

The STA 111 may perform sampling on the received first PPDU at a sampling rate as high as an integer multiple of a sampling rate conforming to a maximally supportable first bandwidth in order to support the wider bandwidth, may perform filtering on a result of the sampling with a decimation filter having a predetermined pass band, and may perform down-sampling on a result of the filtering at a sampling rate conforming to the first bandwidth, thereby obtaining the second PPDU.

For instance, when the first bandwidth is 80 MHz and the second bandwidth is 160 MHz, the STA 111 may perform sampling on the first PPDU at a sampling rate twice a sampling rate conforming to 80 MHz, perform filtering on a result of the sampling with a decimation filter having a pass band conforming to 80 MHz, and perform down-sampling on a result of the filtering at a sampling rate conforming to 80 MHz, thereby obtaining the second PPDU.

When the first bandwidth is 80 MHz and the second bandwidth is 320 MHz, the STA 111 may perform first sampling on the first PPDU at a sampling rate four times the sampling rate conforming to 80 MHz, perform first filtering on a result of the first sampling with a decimation filter having a pass band conforming to 160 MHz, and perform down-sampling on a result of the first filtering at a sampling rate conforming to 160 MHz. The STA 111 may perform second sampling on a result of the first down-sampling at a sampling rate twice the sampling rate conforming to 80 MHz, perform filtering on a result of the second sampling with the decimation filter having the pass band conforming to 80 MHz, and perform second down-sampling on a result of the second filtering at the sampling rate conforming to 80 MHz, thereby obtaining the second PPDU.

When the STA 111 performs filtering and down-sampling for obtaining the second PPDU from the first PPDU, side lobes may be generated by a non-ideal decimation filter, and the side lobes may cause aliasing in a down-sampling process, thereby degrading the quality of the second PPDU. In addition, side lobes may occur due to a limited performance of the STA 111, for example, the quality of a sampling clock, thereby degrading the quality of the second PPDU.

When the performance of the STA 111 is good, even when a modulation and coding scheme (MCS) having a high data rate is applied to the second PPDU, the STA 111 may smoothly obtain the second PPDU, but, when the performance of the STA 111 is poor and an MCS having a high data rate is applied to the second PPDU, the STA 111 may be unable to obtain the second PPDU. Herein, the STA obtaining a PPDU may also be interpreted as successfully extracting data from the PPDU by successfully demodulating and/or decoding the PPDU. Accordingly, when the AP 101 generates the second PPDU, the STA 111 may transmit its own performance information to the AP 101 to consider the performance in the wider bandwidth of the STA 111. According to an embodiment, the performance of the STA 111 may be determined according to the sharpness of the decimation filter. According to some embodiments, the performance of the STA 111 may be determined according to the quality of the sampling clock. In other examples, the performance of the STA 111 is determined by various factors used in an operation performed to support a wider bandwidth.

According to an embodiment, the performance information transmitted by the STA 111 to the AP 101 may include first performance information indicating first MCSs supportable by the STA 111 in the wider bandwidth according to the performance of the STA 111 from among a plurality of MCSs. The AP 101 may select one first MCS from the first MCSs, based on the first performance information, and may generate the second PPDU allocated to the STA 111, based on the selected first MCS. The AP 101 may transmit the first PPDU including the second PPDU to the STA 111.

According to some embodiments, the performance information may include second performance information indicating whether the STA 111 is able to support the wider bandwidth. The AP 101 may transmit the first PPDU including the second PPDU allocated to the STA 111, by checking, based on the second performance information, that the STA 111 is able to support the wider bandwidth.

According to an embodiment, the performance information may be transmitted by the STA 111 to the AP 101 through at least one of the fields defined in "the IEEE P802.11be specification" (interchangeably, just "IEEE P802.11be"). IEEE P802.11be is a framework for a next generation WLAN standard, succeeding IEEE 802.11ax, which is currently under development but has certain aspects already defined. For instance, the performance information may be transmitted through some IEEE P802.11be fields having no information (empty fields) because of non-conformity to the performance of the STA 111. Alternatively, the performance information is transmitted through a 'reserved' subfield included in some of the fields of IEEE P802.11be.

The STA 111 according to an embodiment may provide performance information related to the wider bandwidth to the AP 101 so that the AP 101 may select an MCS suitable for the performance of the STA 111 and generate the second PPDU allocated to the STA 111. Thus, the STA 111 may effectively obtain the second PPDU from the first PPDU conforming to the second bandwidth wider than a legacy first bandwidth, and consequently, the communication performance of the STA 111 supporting the wider bandwidth may be improved.

According to some embodiments, the STA 111 may include a computer program product used for communication with the AP 101. The computer program product may include a non-transitory computer-accessible storage medium (non-transitory computer readable medium), wherein the non-transitory computer-accessible storage medium may include code executable by at least one processor so that the STA 111 may perform operations according to embodiments. The at least one processor may correspond to processing circuitry 223 of FIG. 2.

Figure 2:
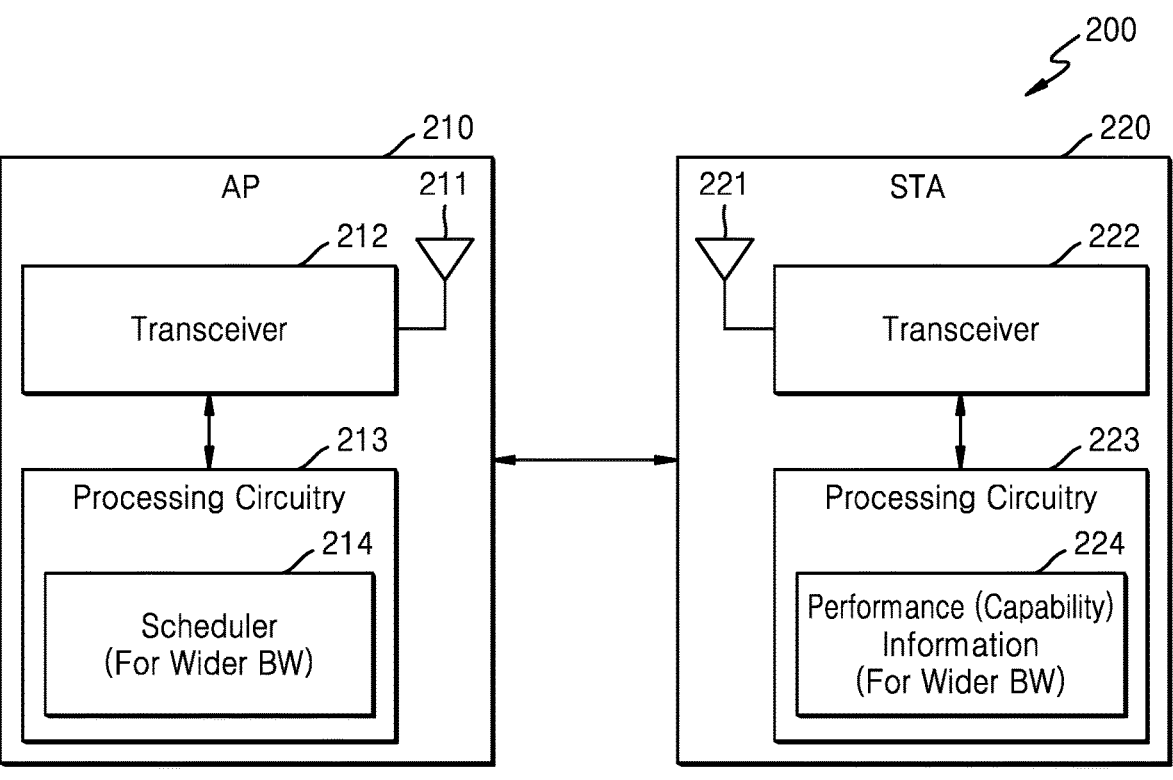
FIG. 2 is a block diagram of a wireless communication system according to an embodiment.

FIG. 2 is a block diagram of a wireless communication system 200 according to an embodiment. The block diagram of FIG. 2 illustrates an AP 210 and a STA 220 that communicate with each other in the wireless communication system 200. Each of the AP 210 and the STA 220 of FIG. 2 may be any device that communicates in the wireless communication system 200, and may be referred to as a device for wireless communication. According to some embodiments, the AP 210 may be one of a plurality of APs included in an AP MLD, and the STA 220 may be one of a plurality of STAs included in a non-AP MLD.

Referring to FIG. 2, the AP 210 may include an antenna 211, a transceiver 212, and the processing circuitry 213. According to some embodiments, the antenna 211, the transceiver 212, and the processing circuitry 213 may be included in one package or may be included in different packages, respectively. The STA 220 may include an antenna 221, a transceiver 222, and a processing circuitry 223. Hereinafter, redundant descriptions between the AP 210 and the STA 220 are omitted.

The antenna 211 may receive a signal from the STA 220 and provide the signal to the transceiver 212, and may transmit a signal provided from the transceiver 212 to the STA 220. According to some embodiments, the antenna 211 may include a plurality of antennas for multiple input multiple output (MIMO). According to some embodiments, the antenna 211 may also include a phased array for beamforming.

The transceiver 212 may process a signal received from the STA 220 through the antenna 211 and may provide the processed signal to the processing circuitry 213. The transceiver 212 may process the signal provided from the processing circuitry 213 and output the processed signal through the antenna 211. The transceiver 212 may include an analog circuit, such as a low noise amplifier, a mixer, a filter, a power amplifier, an oscillator, etc. The transceiver 212 may process a signal received from the antenna 211 and/or a signal received from the processing circuitry 213, under control by the processing circuitry 213.

The processing circuitry 213 may extract information transmitted by the STA 220 by processing the signal received from the transceiver 212. For example, the processing circuitry 213 may extract information by demodulating and/or decoding the signal received from the transceiver 212. The processing circuitry 213 may generate a signal including information to be transmitted to the STA 220, and provide the signal to the transceiver 212. For example, the processing circuitry 213 may provide, to the transceiver 212, a signal generated by encoding and/or modulating data to be transmitted to the STA 220. According to some embodiments, the processing circuitry 213 may include a programmable component, such as a central processing unit (CPU) or a digital signal processor (DSP); a reconfigurable component, such as a field programmable gate array (FPGA); or a component that provides a fixed function, such as an intellectual property (IP) core. According to some embodiments, the processing circuitry 213 may include or access memory that stores data and/or a series of instructions. Herein, the transceiver 212 and/or the processing circuitry 213 performing operations may be simply referred to as the AP 210 performing the corresponding operations. Accordingly, operations performed by the AP 210 may be performed by the transceiver 212 and/or the processing circuitry 213 included in the AP 210, and operations performed by the STA 220 may be performed by the transceiver 221 and/or the processing circuitry 224 included in the STA 220.

The STA 220 may support transmission/reception up to the first bandwidth (or alternatively, within at least the first bandwidth) through the antenna 221 and the transceiver 222, and the STA 220 may receive a first PPDU conforming to the second bandwidth wider than the first bandwidth by using the antenna 221 and the transceiver 222. The processing circuitry 223 may obtain a second PPDU allocated to the STA 220 from the first PPDU by performing an operation of supporting the wider bandwidth.

The processing circuitry 223 may manage performance information 224 related to the supporting of the wider bandwidth. The performance information 224 may include at least one of first performance information indicating the performance of the STA 220 when the STA 220 performs an operation for supporting the wider bandwidth and second performance information indicating whether the STA 220 is able to support the wider bandwidth.

The first performance information may include information indicating first MCSs supportable by the STA 220 when the STA 220 performs the operation for supporting the wider bandwidth from among a plurality of candidate MCSs (hereafter, just "the plurality of MCSs"). For example, the plurality of MCSs may include MCSs defined from index 0 to index 15 in the P802.11be specification.

The STA 220 may smoothly obtain a second PPDU generated based on one of the first MCSs from the first PPDU, but may be unable to obtain a second PPDU generated based on any of the remaining MCSs (other than the first MCSs). Thus, the STA 220 may inform the AP 210 of its capability state (the state of STA 220) by transmitting the first performance information to the AP 210.

For example, the first performance information may include bits indicating which of the plurality of MCSs are supportable. This will be described in detail below with reference to FIGS. 7A and 7B.

For example, the first performance information may include bits indicating whether each of specific MCSs having data rates equal to or greater than a reference value from among the plurality of MCSs is supportable. This will be described in detail below with reference to FIGS. 8A and 8B.

For example, the first performance information may include bits indicating a specific MCS having a highest data rate from among the first MCSs. This will be described in detail below with reference to FIGS. 9A and 9B.

For example, the first performance information may include at least one bit indicating an offset from a specific MCS having a highest data rate from among "second MCSs". Herein, the "second MCSs" may correspond to MCSs supportable by the STA 220 when the STA 220 receives a third PPDU conforming to a third bandwidth less than or equal to the first bandwidth supportable for transmission and reception, from among the plurality of MCSs. In other words, the second MCSs may correspond to MCSs supportable when the STA 220 receives the third PPDU conforming to its own transmission/reception performance. This will be described in detail below with reference to FIGS. 10A through 11C.

For example, the first performance information may include at least one bit indicating an offset from a specific MCS having a highest data rate of at least one of a plurality of MCS groups. Herein, the plurality of MCS groups may be classified by grouping MCSs having the same maximum number of spatial streams in the second MCSs. This will be described in detail below with reference to FIGS. 13A through 13C.

For example, the first performance information may include information indicating the first MCSs respectively corresponding to values that the second bandwidth may have. In detail, when the maximally supportable first bandwidth of the STA 220 is 80 MHz and the second bandwidth is 160 MHz or 320 MHz, the first performance information may include pieces of information respectively indicating first MCSs when a wider bandwidth corresponding to 160 MHz is supported and first MCSs when a wider bandwidth corresponding to 320 MHz is supported.

For example, the first performance information may include information indicating a rejection level additionally supportable by the STA 220 in relation to adjacent channel rejection levels associated with the plurality of MCSs. This will be described in detail below with reference to FIGS. 16A and 16B.

According to an embodiment, the performance information 224 may be stored in a non-volatile memory of the STA 220 and may be read from the processing circuitry 223. The processing circuitry 223 may control the transceiver 222 to transmit a signal including the read-out performance information 224 ("transmit the performance information") to the AP 210. According to some embodiments, the processing circuitry 223 may include a first circuit that manages the performance information 224, and a second circuit that controls the transceiver 222 to transmit the performance information 224 to the AP 210. In other words, the first circuit that manages the performance information may logically and/or physically differ from the second circuit that controls the transceiver 222.

According to an embodiment, the processing circuitry 213 of the AP 210 may include a scheduler 214, which may select one MCS from the supportable MCSs, based on the performance information received from the STA 220 via the antenna 211 and the transceiver 212. The scheduler 214 may generate the second PPDU allocated to the STA 220, based on the selected MCS. The scheduler 214 may estimate a channel state between the AP 210 and the STA 220 or receive information about an estimated channel state from the STA 220, and may select one of the first MCSs by further considering the estimated channel state. To this end, in an example, when the estimated channel state is considered good according to at least one predetermined criterion, the scheduler 214 may generate a second PPDU by selecting an MCS having a highest data rate among the supportable MCSs. However, when the estimated channel state is a poor state according to at least one predetermined criterion, the scheduler 214 may generate a second PPDU by selecting an MCS having a low data rate among the supportable MCSs according to how poor the channel state is. In other examples, the scheduler 214 may select one of the MCSs, based on at just one of the performance information 224 or the channel state to generate the second PPDU.

According to an embodiment, the scheduler 214 may allocate the second PPDU to remaining RUs excluding RUs located at the boundary of a band supported by the STA 220 from among a plurality of RUs included in the band. In other words, because the side lobes and aliasing described above with reference to FIG. 1 occur by subcarriers located at the boundary of the band, the second PPDU may not be allocated to RUs including these subcarriers. This will be described in detail below with reference to FIGS. 18A and 18B.

According to an embodiment, the scheduler 214 may include the second PPDU, and may transmit the first PPDU conforming to the second bandwidth to the STA 220 by using the antenna 211 and the transceiver 212. The first PPDU may further include a PPDU allocated to at least one other STA (not shown).

According to some embodiments, the processing circuitries 213 and 223 may be referred to as processors, controllers, or the like.

Figure 3A:
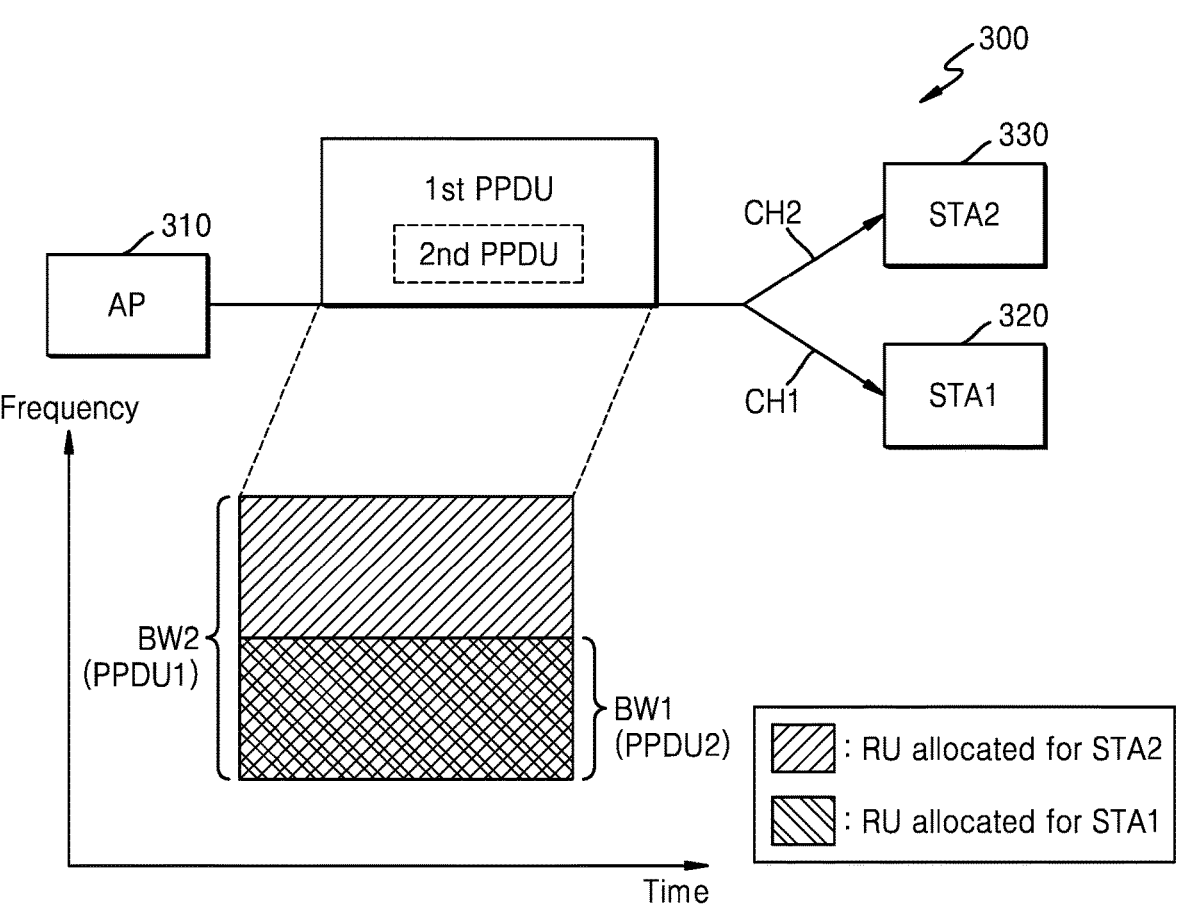
Figure 3B:
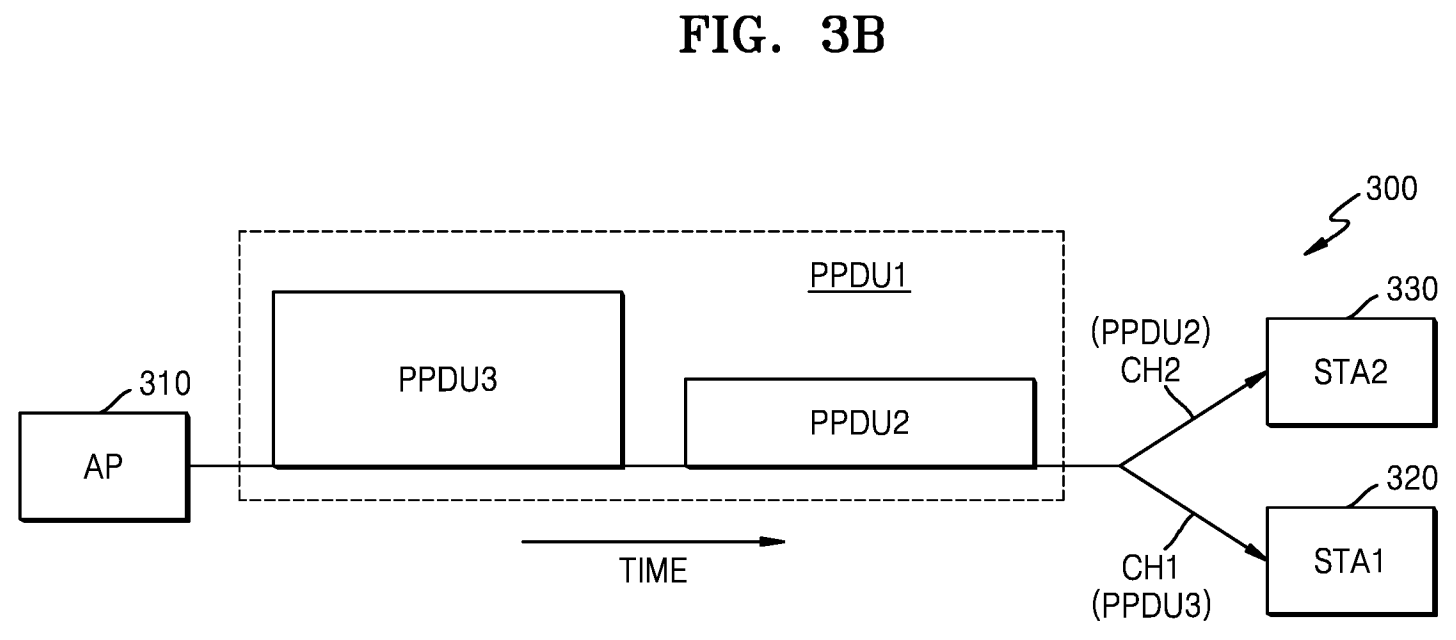

FIGS. 3A and 3B are block diagrams for explaining an operation of a wireless communication system 300 according to an embodiment.

Referring to FIG. 3A, the wireless communication system 300 may include an AP 310, a first STA 320, and a second STA 330. The first STA 320 may support at least a first bandwidth BW1 during transmission and reception, and the second STA 330 may support at least a second bandwidth BW2 during transmission and reception.

According to an embodiment, the first STA 320 may transmit, to the AP 310, first performance information indicating first MCSs supportable in a wider bandwidth from among a plurality of candidate MCSs. The AP 310 may generate a first PPDU, based on the first performance information, transmit the first PPDU to the first STA 320 Via a first channel CH1, and transmit the first PPDU to the second STA 330 via a second channel CH2. A first PPDU conforming to the second bandwidth BW2 may include the second PPDU allocated to the first STA 320. Thus, the first PPDU may be understood as a "composite PPDU" or an "aggregated PPDU", and may include a third PPDU allocated to the second STA 330. When the first PPDU includes second and third PPDUs, it may be understood as a "composite PPDU" or an "aggregated PPDU" in which at least two PPDUs allocated to different respective STAs are transmitted over the same timeframe, e.g., with a first set of OFDM subcarriers representing the second PPDU and a second set of OFDM subcarriers representing the third PPDU. In one example, the second PPDU conforms to the first bandwidth BW1 (e.g., the second PPDU is represented by OFDM subcarriers distributed only within the first bandwidth BW1). In other examples, the second PPDU conforms to a bandwidth between the first bandwidth and the second bandwidth.

The second PPDU may be generated by applying an MCS selected according to the first performance information, where the selected MCS may be the same as or different from an MCS applied to the third PPDU. According to some embodiments, the same MCS may be controlled to be used for generation of the second and third PPDUs included in the first PPDU. For example, when an MCS corresponding to the second PPDU is different from an MCS corresponding to the third PPDU, an MCS having a low data rate among the MCSs may be controlled to be commonly used for generation of the second and third PPDUs. As another example, when an MCS corresponding to the second PPDU is different from an MCS corresponding to the third PPDU, an MCS having a high data rate among the MCSs may be controlled to be commonly used for generation of the second and third PPDUs.

The first STA 320 may transmit, to the AP 310, "second performance information" indicating whether the wider (second) bandwidth is supportable. Referring to FIG. 3B, when the first STA 320 is unable to support the wider bandwidth and indicates such lack of capability with the second performance information, the AP 310 may sequentially transmit the second PPDU conforming to the first bandwidth BW1 and the third PPDU conforming to the second bandwidth BW2 to the first STA 320 and the second STA 330, respectively. Alternatively, the second and third PPDUs are transmitted simultaneously (e.g., using different respective OFDM subcarriers as mentioned earlier).

Figure 4:
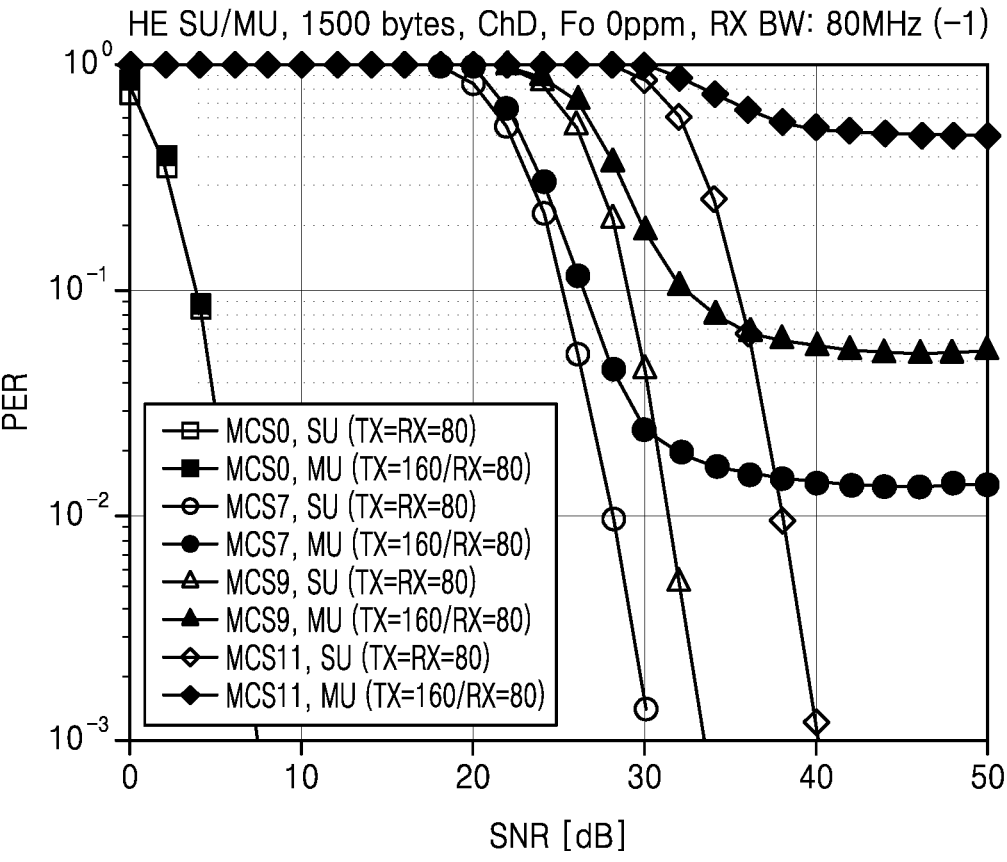
FIG. 4 is a graph showing a relationship between an error rate of a physical packet data unit (PPDU) allocated to a station (STA) supporting a wider bandwidth and a modulation and coding scheme (MCS)

FIG. 4 is a graph showing a relationship between an error rate of a PPDU allocated to a STA supporting a wider bandwidth and an MCS. In FIG. 4, MCS0, MCS7, MCS9, and MCS11 refer to MCSs having indexes of 0, 7, 9, and 11 defined in IEEE P802.11be. A modulation scheme and a coding rate of MCS0 are binary phase shift keying (BPSK) and 1/2, a modulation scheme and a coding rate of MCS7 are 64-quadrature amplitude modulation (QAM) and 5/6, a modulation scheme and a coding rate of MCS9 are 256-QAM and 5/6, and a modulation scheme and a coding rate of MCS11 are 1024-QAM and 5/6. SU refers to a single user, and MU refers to multiple users. 'TX=RX=80' means that a bandwidth of a PPDU transmitted by an AP is 80 MHz and a STA supports reception up to 80 MHz. 'TX=160/RX=80' means that the bandwidth of the PPDU transmitted by an AP is 160 MHz and the STA supports reception up to 80 MHz. In this case, the STA performs an operation for supporting a wider bandwidth.

Referring to FIG. 4, it may be seen that, when one of MCS7, MCS9 and MCS11 in the wider bandwidth is applied to the PPDU allocated to the STA, even when a signal to noise ratio (SNR) increases, a packet error rate (PER) does not improve. The STA may support up to MCS11 in response to a PPDU conforming to 80 MHz, which is the reception capability of the STA, but may not support MCS7, MCS9, and MCS11 due to a relatively high PER in response to a PPDU conforming to 160 MHz.

In other words, MCSs supportable by the STA in the wider bandwidth may be limited to MCSs having lower data rates than the data rate of MCS7.

The STA according to an embodiment may transmit performance information indicating the MCSs supportable in the wider bandwidth to the AP considering the performance in the wider bandwidth. The AP may select an MCS from the performance information and apply the selected MSC to the PPDU allocated to the STA performing an operation for supporting the wider bandwidth.

FIG. 5A is a view illustrating enhancements for extremely high throughput (EHT) capabilities element format for transmitting performance information according to an embodiment. FIGS. 5B and 5C are views illustrating 'EHT PHY Capabilities Information' fields for transmitting performance information according to an embodiment.

Referring to FIG. 5A, the 'EHT Capabilities element format' may include an 'Element' field, a 'Length' field, an 'Element ID Extension' field, an 'EHT MAC Capabilities Information' field, the 'EHT PHY Capabilities Information' field, a 'Supported EHT-MCS And NSS Set' field, and an 'EHT PPE Thresholds' field (Optional). The fields of the 'EHT Capabilities element format' are defined in IEEE P802.11be, and thus detailed descriptions other than those related to the inventive concept will be omitted.

According to an embodiment, the performance information of the STA in a wide band may be included in one of the 'EHT PHY Capabilities Information' field and the 'Supported EHT-MCS And NSS Set' field and may be transmitted to an AP. The number of bits included in the 'EHT PHY Capabilities Information' field and the number of bits included in the 'Supported EHT-MCS And NSS Set' field may vary depending on a representation scheme indicating the performance of a STA. In other embodiments. performance information is transmitted to the AP using the other fields of the 'EHT Capabilities element format'.

Referring further to FIG. 5B, the 'EHT PHY Capabilities Information' field may include a 'Reserved' sub-field, a 'Support For 320 MHz In 6 GHz' sub-field, a 'Support For 242-tone RU In BW Wider Than 20 MHz' sub-field, an 'NDP With 4×EHT-LTF And 3.2 μs GI' sub-field, a 'Partial Bandwidth UL MU-MIMO' sub-field, an 'SU Beamformer' sub-field, an 'SU Beamformee' sub-field, a 'Beamformee SS(≥80 MHz)' sub-field, a 'Beamformee SS(=160 MHz)' sub-field, a Beamformee SS(=320 MHz)' sub-field, a 'Number Of Sounding Dimensions(≥80 MHz)' sub-field, a 'Number Of Sounding Dimensions(=160 MHz)' sub-field, a 'Number Of Sounding Dimensions(=320 MHz)' sub-field, an 'Ng=16 SU Feedback' sub-field, an 'Ng=16 MU Feedback' sub-field, a 'Codebook Size (φ, ψ)={4, 2} SU Feedback' sub-field, a 'Codebook Size (φ, ψ)={7, 5} MU Feedback' sub-field, a 'Triggered SU Beamforming Feedback' sub-field, a 'Triggered MU Beamforming Partial BW Feedback' sub-field, a 'Triggered CQI Feedback' sub-field, a 'Partial Bandwidth DL MU-MIMO' sub-field, a 'PSR-Based SR Support' sub-field, a 'Power Boost Factor Support' sub-field, an 'EHT MU PPDU With 4×EHT-LTF And 3.8 μs GI' sub-field, a 'Max Nc' sub-field, a 'Non-Triggered CQI Feedback' sub-field, a 'Tx 1024-QAM And 4096-QAM<242-tone RU Support' sub-field, an 'Rx 1024-QAM And 4096-QAM<242-tone RU Support' sub-field, a 'PPE Thresholds Present' sub-field, a 'Common Nominal Packet Padding' sub-field, a 'Maximum Number Of Supported EHT-LTFs' sub-field, a 'Support Of MCS 15' sub-field, a 'Support Of EHT DUP In 6 GHz' sub-field, a 'Support For 20 MHz Operating the STA Receiving NDP With Wider Bandwidth' sub-field, a 'Non-OFDMA UL MU-MIMO (BW≥80 MHz)' sub-field, a 'Non-OFDMA UL MU-MIMO (BW=160 MHz)' sub-field, a 'Non-OFDMA UL MU-MIMO(BW=320 MHz)' sub-field, an 'MU Beamformer(BW≥80 MHz)' sub-field, an 'MU Beamformer (BW=160 MHz)' sub-field, an 'MU Beamformer(BW=320 MHz)' sub-field and a 'Wider BW Support' sub-field.

According to an embodiment, the 'Wider BW Support' sub-field may include the performance information of the STA. The 'Wider BW Support' sub-field may include n bits, where the number n may be determined according to the number of bits constituting the performance information of the STA. As described above, the number of bits constituting the performance information of the STA may vary depending on representation schemes indicating the performance of the STA.

According to an embodiment, the performance information of the STA included in the 'Wider BW Support' sub-field may include the first performance information indicating the first MCSs supportable by the STA in the wider bandwidth, and/or the second performance information indicating whether the STA is able to support the wider bandwidth.

Referring further to FIG. 5C, as shown in FIG. 5B, the 'Wider BW Support' sub-field for transmitting the performance information of the STA may not be separately defined, and the performance information of the STA instead of Null data may be included in a specific sub-field that may be filled with the Null data according to the state of the STA, a communication state, and the like and may be transmitted to the AP. For example, when the 'Support for 242-tone RU In BW Wider Than 20 MHz' sub-field is scheduled to be filled with the Null data, the performance information of the STA instead of the Null data may be transmitted to the AP. In other examples, the performance information of the STA is included in another sub-field and transmitted to the AP in a specific situation.

Embodiments in which the STA supports the wider bandwidth and transmits first performance information indicating the first MCSs supportable in the wider bandwidth to the AP will now be mainly described.

Figure 6:
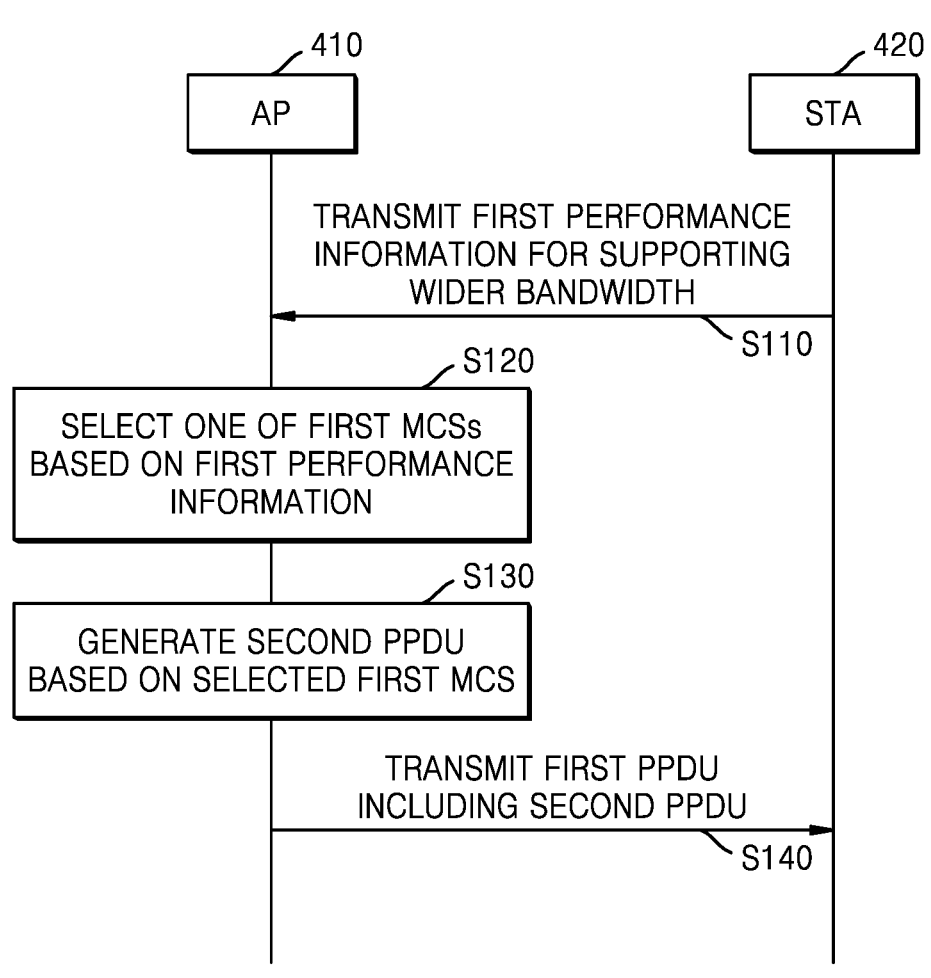
FIG. 6 is a flowchart of operation methods of an access point (AP) and a STA, according to an embodiment.

FIG. 6 is a flowchart of operation methods of an AP 410 (an example of any of APs 101, 103 or 210) and a STA 420 (an example of any of STAs 111-114, 220, 320 or 330), according to an embodiment.

In operation S110, the STA 420 may transmit, to the AP 410, first performance information for supporting a wider bandwidth, where the first performance information may indicate first MCSs supportable by the STA 420 in the wider bandwidth. In operation S120, the AP 410 may select one of first MCSs, based on the first performance information. According to an embodiment, the AP 410 may select a first MCS having a highest data rate from among the first MCSs. According to some embodiments, the AP 410 may select one of the first MCSs by further considering a channel state with the STA 420. The channel state may be estimated by the AP 410 based on a sounding reference signal received from the STA 420, or may be estimated by the STA 420 and reported as feedback to the AP 410. In operation S130, the AP 410 may generate a second PPDU allocated to the STA 420, based on the selected first MCS. In operation S140, the AP 410 may transmit the first PPDU including the second PPDU to the STA 420. A second bandwidth conforming to the first PPDU may be greater than a first bandwidth conforming to the second PPDU. Alternatively, the first bandwidth and the second bandwidth are equal.

Figure 7A:
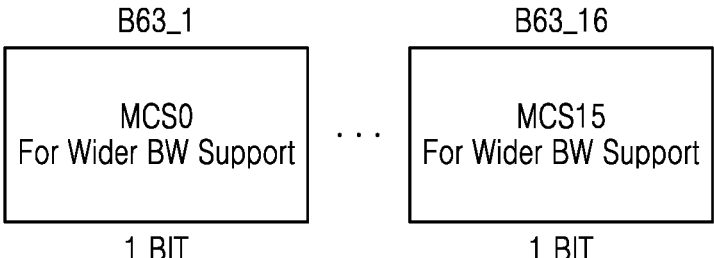
FIG. 7A is a view illustrating first performance information according to an embodiment.

FIG. 7A is a view illustrating first performance information according to an embodiment, and FIG. 7B is a view for explaining the performance of a STA indicated by the first performance information of FIG. 7A.

Referring to FIG. 7A, the first performance information may include 16 bits representing whether each of MCS0 having index 0 through MCS15 having index 15 defined in the IEEE P802.11be is supportable. For example, the value of a bit when a STA is able to support MCS0 may be set to be '1', and the value of a bit when the STA is unable to support MCS0 may be set to be '0', or vice versa.

Referring further to FIG. 7B, MCSs are arranged in a direction in which a data rate increases. Embodiments are described on the assumption that the AP and the STA identify MCSs based on the MCSs arranged in the above direction. A modulation scheme and a coding rate of MCS14 having index 14 may be BPSK-DCM-DUP and 1/2, a modulation scheme and a coding rate of MCS15 having index 15 may be BPSK-DCM and 1/2, a modulation scheme and a coding rate of MCS0 having index 0 may be BPSK and 1/2, a modulation scheme and a coding rate of MCS1 having index 1 may be QPSK and 1/2, a modulation scheme and a coding rate of MCS2 having index 2 may be quadrature phase shift keying (QPSK) and 3/4, a modulation scheme and a coding rate of MCS3 having index 3 may be 16-QAM and 1/2, a modulation scheme and a coding rate of MCS4 having index 4 may be 16-QAM and 3/4, a modulation scheme and a coding rate of MCSS having index 5 may be 64-QAM and 2/3, a modulation scheme and a coding rate of MCS6 having index 6 may be 64-QAM and 3/4, a modulation scheme and a coding rate of MCS7 having index 7 may be 64-QAM and 5/6, a modulation scheme and a coding rate of MCS8 having index 8 may be 256-QAM and 3/4, a modulation scheme and a coding rate of MCS9 having index 9 may be 256-QAM and 5/6, a modulation scheme and a coding rate of MCS10 having index 10 may be 1024-QAM and 3/4, a modulation scheme and a coding rate of MCS11 having index 11 may be 1024-QAM and 5/6, a modulation scheme and a coding rate of MCS12 having index 12 may be 4096-QAM and 3/4, and a modulation scheme and a coding rate of MCS13 having index 13 may be 4096-QAM and 5/6.

The AP may identify first MCSs supportable by the STA in the wider bandwidth from among MCS0 through MCS15, based on the first performance information.

It will be fully understood that other MCSs may be further defined in addition to the MCSs defined in FIG. 7B, and the technical spirit of the inventive concept is applicable to the other MCSs.

FIG. 8A is a view illustrating first performance information according to an embodiment, and FIG. 8B is a view for explaining the performance of a STA indicated by the first performance information of FIG. 8A.

Referring to FIG. 8A, the first performance information may include bits indicating whether each of specific MCSs having data rates equal to or greater than a reference value from among MCS0 through MCS15 defined in IEEE P802.11be. For example, the specific MCSs may include MCS12 and MCS13. In this case, the first performance information may include two bits. According to an embodiment, specific MCSs of which support possibility is indicated by the first performance information may be variously determined in advance, and the specific MCSs may be identified in advance by the AP and the STA.

Referring further to FIG. 8B, the AP may identify whether the STA is able to support each of MCS12 and MCS13 in the wider bandwidth, based on the first performance information. The AP may identify that MCS0 through MCS11, MCS14, and MCS15 having lower data rates than MCS12 are supportable by the STA in the wider bandwidth.

Figure 9A:
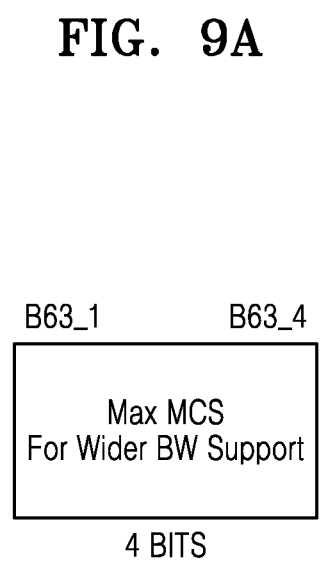

FIG. 9A is a view illustrating first performance information according to an embodiment, and FIG. 9B is a view for explaining the performance of a STA indicated by the first performance information of FIG. 9A.

Referring to FIG. 9A, the first performance information may include bits indicating a specific MCS having a highest data rate from among MCS0 through MCS15 defined in IEEE P802.11be. For example, the number of MCSs defined in IEEE P802.11be is 16, and the first performance information may include four bits such that the first performance information may indicate a specific MCS.

Referring further to FIG. 9B, when the specific MCS is MCS11, the AP may identify MCS0 through MCS11, MCS14, and MCS15 having data rates less than or equal to the data rate of MCS11 as first MCSs supportable by the STA in the wider bandwidth, based on the first performance information. In other words, the AP may identify that the STA is unable to support MCS12 and MCS13 in the wider bandwidth, based on the first performance information.

Figure 10A:
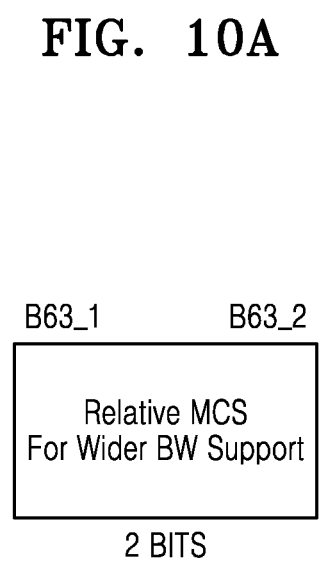

FIG. 10A is a view illustrating first performance information according to an embodiment, and FIG. 10B is a view for explaining the performance of a STA indicated by the first performance information of FIG. 10A. In FIG. 10A, when the STA receives a third PPDU conforming to a third bandwidth less than or equal to the first bandwidth supportable during legacy protocol transmission and reception, it is assumed that information indicating "second MCSs" supportable by the STA from among MCS0 through MCS15 defined in IEEE P802.11be is transmitted to the AP through the 'Supported EHT-MCS And NSS Set' field of FIG. 5A. For example, the information indicating second MCSs may be included in the 'EHT-MCS Map(BW≥80 MHz, Except 20 MHz-Only Non-the AP the STA)' sub-field of the 'Supported EHT-MCS And NSS Set' field. For convenience of explanation, the second MCSs may be referred to as MCSs supportable by the STA in a "normal bandwidth".

Referring to FIG. 10A, the first performance information may include relative MCS information. The relative MCS information may include at least one bit indicating an offset from a specific MCS having a highest data rate from among the second MCSs. The first performance information may include a number of bits determined according to the range of the offset. For example, the first performance information may include two bits when the offset may have any one of values of 0 through 3.

Referring further to FIG. 10B, when the offset is 2 and a second MCS having a highest data rate from among second MCSs supportable by the STA in the normal bandwidth is MCS12, the AP may identify MCS0 through MCS10, MCS14, and MCS15 having data rates less than or equal to the data rate of MCS10 apart from MCS12 by 2 as first MCSs supportable by the STA in the wider bandwidth, based on the first performance information.

Figure 11A:
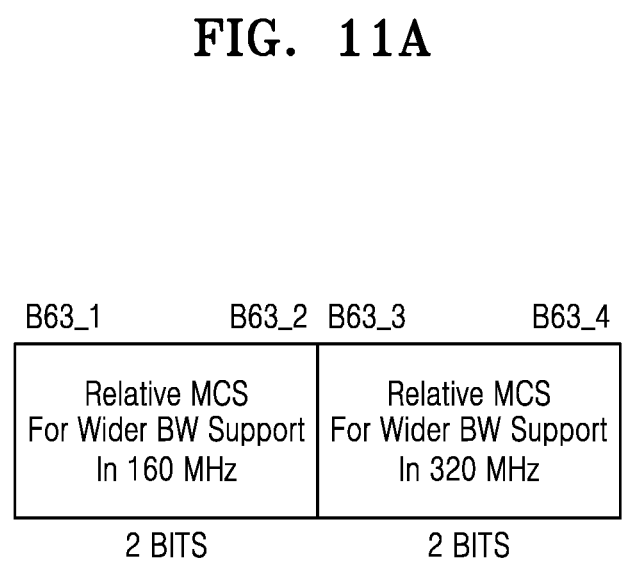

FIGS. 11A through 11C are views illustrating first performance information according to an embodiment. In FIG. 11A, as described above, it is assumed as an example that the STA may support a first bandwidth of up to 80 MHz and a second bandwidth greater than the first bandwidth may be 160 MHz or 320 MHz. Descriptions of FIGS. 11A through 11C that are the same as that given above with reference to FIG. 10A will now be omitted.

Referring to FIG. 11A, the first performance information may include information indicating first MCS s respectively corresponding to values that the second bandwidth may have in the wider bandwidth. For example, the first performance information may include information indicating first MCSs supportable by a STA in the wider bandwidth when the second bandwidth is 160 MHz, and information indicating first MCSs supportable by the STA in the wider bandwidth when the second bandwidth is 320 MHz.

According to an embodiment, an AP may finely select an MCS for generating a PPDU allocated to the STA considering the performance of the STA segmented according to the value of the second bandwidth, based on the first performance information.

Referring further to FIG. 11B, the first performance information may include information indicating an offset from an MCS conforming to 1024-QAM in the normal bandwidth and information indicating an offset from an MCS conforming to 4096-QAM in the normal bandwidth.

According to an embodiment, the AP may finely select an MCS for generating a PPDU allocated to the STA considering the performance of the STA segmented for each MCS, based on the first performance information.

Referring further to FIG. 11C, the first performance information may include information indicating an offset from an MCS conforming to 1024-QAM in the normal bandwidth and information indicating an offset from an MCS conforming to 4096-QAM in the normal bandwidth, when the second bandwidth is 160 MHz, and may include information indicating an offset from an MCS conforming to 1024-QAM in the normal bandwidth and information indicating an offset from an MCS conforming to 4096-QAM in the normal bandwidth, when the second bandwidth is 320 MHz.

Figure 12:
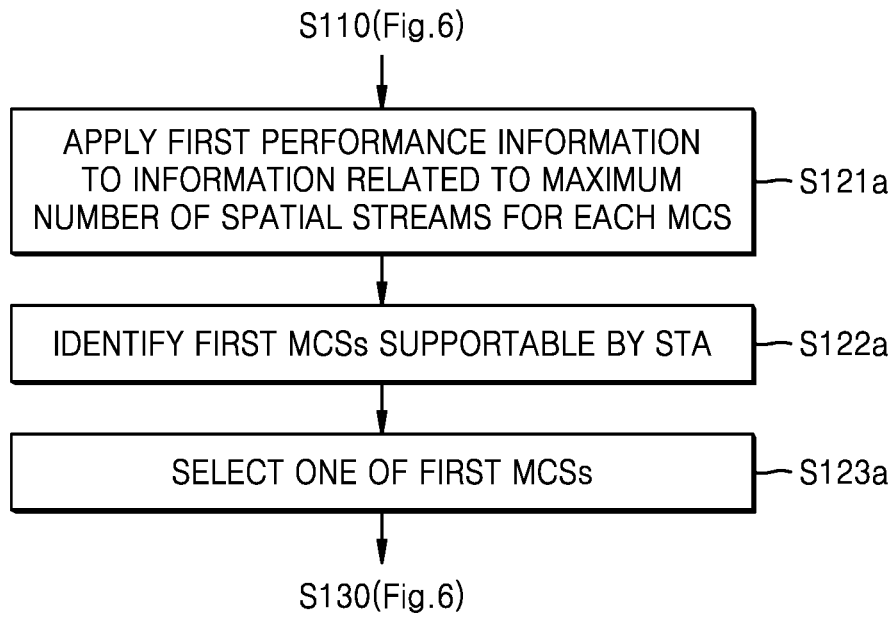
FIG. 12 is a flowchart of an embodiment of operation S120 of FIG. 6.

FIG. 12 is a flowchart of an embodiment of operation S120 of FIG. 6.

Referring to FIG. 12, in operation S121a following operation S110 of FIG. 6, the AP 410 may apply the first performance information to information related to the maximum number of spatial streams for each MCS. In operation S122a, the AP 410 may identify first MCSs supportable by the STA 420 in the wider bandwidth, based on a result of operation S121a. In operation S123a, the AP 410 may select one of the first MCSs to generate a PPDU allocated to the STA 420. Detailed descriptions of the embodiment of FIG. 12 are provided with reference to FIGS. 13A through 13C.

Figure 13A:
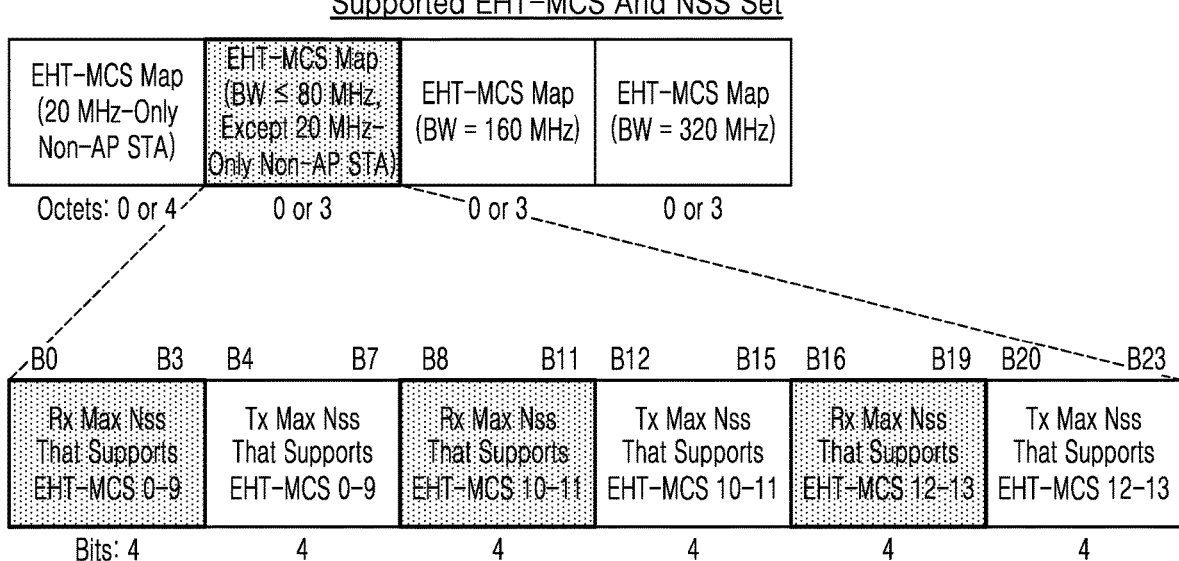
FIG. 13A is a view illustrating a 'Supported EHT-MCS And NSS Set' field for transmitting first performance information, according to an embodiment.

FIG. 13A is a view illustrating a 'Supported EHT-MCS And NSS Set' field for transmitting first performance information, according to an embodiment, and FIGS. 13B and 13C are views for explaining the performance of a STA indicated by the first performance information.

Referring to FIG. 13A, the 'Supported EHT-MCS And NSS Set' field may include an 'EHT-MCS Map(20 MHz-Only Non-the AP the STA)' sub-field, an 'EHT-MCS Map (BW≥80 MHz, Except 20 MHz-Only Non-the AP the STA)' sub-field, an 'EHT-MCS Map(BW=160 MHz)' sub-field, and an 'EHT-MCS Map(BW=320 MHz)' sub-field. The 'Supported EHT-MCS And NSS Set' field is defined in IEEE P802.11be, and thus detailed descriptions other than those related to the inventive concept will be omitted.

The 'EHT-MCS Map(BW≥80 MHz, Except 20 MHz-Only Non-the AP the STA)' sub-field may include the information related to the maximum number of spatial streams for each MCS of FIG. 12.

The 'EHT-MCS Map(BW≥80 MHz, Except 20 MHz-Only Non-the AP the STA)' sub-field may include an 'Rx Max Nss That Supports EHT-MCS 0-9' sub-field, a 'Tx Max Nss That Supports EHT-MCS 0-9' sub-field, an 'Rx Max Nss That Supports EHT-MCS 10-11' sub-field, a 'Tx Max Nss That Supports EHT-MCS 10-11' sub-field, an 'Rx Max Nss That Supports EHT-MCS 12-13' sub-field, and a 'Tx Max Nss That Supports EHT-MCS 12-13' sub-field. Nss or NSS may refer to the number of spatial streams.

In detail, the information related to the maximum number of spatial streams for each MCS of FIG. 12 may be included in the 'Rx Max Nss That Supports EHT-MCS 0-9' sub-field, the 'Rx Max Nss That Supports EHT-MCS 10-11' sub-field and the 'Rx Max Nss That Supports EHT-MCS 12-13' sub-field.

The 'Rx Max Nss That Supports EHT-MCS 0-9' sub-field may indicate the maximum number of spatial streams supportable by the STA within MCS0 through MCS9, the 'Rx Max Nss That Supports EHT-MCS 10-11' sub-field may indicate the maximum number of spatial streams supportable by the STA within MCS10 and MCS11, and the 'Rx Max Nss That Supports EHT-MCS 12-13' sub-field may indicate the maximum number of spatial streams supportable by the STA within MCS12 and MCS13. Although MCS14 and MCS15 are not illustrated in FIG. 13A, MCS14 and MCS15 may be processed according to MCS0 through MCS9.

Referring further to FIG. 13B, the value of a subfield may indicate the maximum number of spatial streams. For example, the 'Rx Max Nss That Supports EHT-MCS 0-9' sub-field, the 'Rx Max Nss That Supports EHT-MCS 10-11' sub-field, and the 'Rx Max Nss That Supports EHT-MCS 12-13' sub-field may have values of 0 through 15. When the value of a subfield is 0, it indicates that spatial multiplexing is not supported, and, when the value of the subfield is each of 1 through 8, it indicates that the maximum number of spatial streams may be supported as each of 1 through 8. The maximum number of spatial streams for which subfield values conform to 9 through 15 may be in a 'reserved' state.

In FIG. 13C, it is assumed that the 'Rx Max Nss That Supports EHT-MCS 0-9' sub-field, the 'Rx Max Nss That Supports EHT-MCS 10-11' sub-field, and the 'Rx Max Nss That Supports EHT-MCS 12-13' sub-field have values of 4, 2, and 1, respectively, and the offset of the first performance information conforming to FIG. 10A is 1. In other words, the STA may support four maximum spatial streams when supporting MCS0 through MCS9 in the normal bandwidth, support two maximum spatial streams when supporting MCS10 and MCS11 in the normal bandwidth, and support one maximum spatial stream when supporting MCS11 and MCS12 in the normal bandwidth. MCS0 through MCS9 may be referred to as being included in a first MCS group, MCS10 and MCS11 may be referred to as being included in a second MCS group, and MCS12 and MCS13 may be referred to as being included in a third MCS group.

Referring to FIG. 13C, the first performance information may indicate an offset from a specific MCS having a highest data rate from at least one of first through third MCS groups.

In a first case, the AP may identify first MCSs supportable by the STA in the wider bandwidth by applying the first performance information in the first through third MCS groups. In other words, the AP may identify, as the first MCSs, MCS0 through MCS8 having data rates less than or equal to the data rate of MCS8 spaced apart by 1 from MCS9 having a highest data rate from the first MCS group, MCS10 spaced apart by 1 from MCS11 having a highest data rate from the second MCS group, and MCS12 spaced apart by 1 from MCS13 having a highest data rate from the third MCS group.

In a second case, the AP may identify the first MCSs by selectively applying the first performance information to the first MCS group supporting a largest number of, namely, four, maximum spatial streams from among the first through third MCS groups. In other words, the AP may identify, as the first MCSs, MCS0 through MCS8 and MCS10 through MCS13 having data rates less than or equal to the data rate of MCS8 spaced apart by 1 from MCS9 having a highest data rate in the first MCS group.

In a third case, the AP may identify the first MCSs by selectively applying the first performance information to the third MCS group including an MCS having a highest data rate from among the first through third MCS groups. In other words, the AP may identify, as the first MCSs, MCS12 and MCS0 through MCS11 spaced apart by 1 from MCS13 having a highest data rate in the third MCS group.

In a fourth case, the AP may identify the first MCSs by selectively applying the first performance information to the second and third MCS groups including MCSs having data rates equal to or greater than a reference value from among the first through third MCS groups. In other words, the AP may identify, as the first MCSs, MCS10 spaced apart by 1 from MCS11 having a highest data rate from the second MCS group, MCS12 spaced apart by 1 from MCS13 having a highest data rate from the third MCS group, and MCS0 through MCS9.

In other embodiments, the AP identifies the first MCSs supportable by the STA in the wider bandwidth by applying the first performance information to at least one of the first through third MCS groups in various ways.

Figure 14:
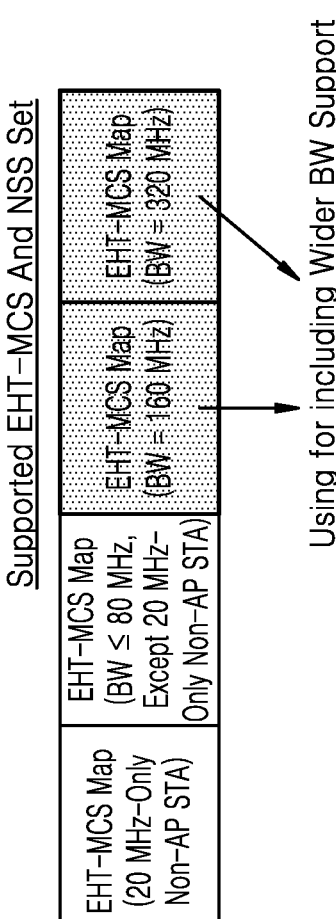
FIG. 14 is a view illustrating a 'Supported EHT-MCS And NSS Set' field for transmitting first performance information, according to an embodiment.

FIG. 14 is a view illustrating a 'Supported EHT-MCS And NSS Set' field for transmitting first performance information, according to an embodiment.

Referring further to FIG. 14, the first performance information may be included in at least one of an 'EHT-MCS Map(BW=160 MHz)' sub-field and an 'EHT-MCS Map (BW=320 MHz)' sub-field and may be transmitted to an AP. In other words, at least one of the 'EHT-MCS Map(BW=160 MHz)' sub-field and the 'EHT-MCS Map(BW=320 MHz)' sub-field may be used to transmit the first performance information to the AP.

When a STA supports a first bandwidth of 80 MHz or less, the 'EHT-MCS Map(BW=160 MHz)' sub-field and the 'EHT-MCS Map(BW=320 MHz)' sub-field may be filled with Null data. Thus, according to an embodiment, the first performance information instead of the Null data may be included in one of the 'EHT-MCS Map(BW=160 MHz)' sub-field and the 'EHT-MCS Map(BW=320 MHz)' sub-field and may be transmitted to the AP.

According to an embodiment, first performance information configured in the same or similar manner as or to the method described above with reference to FIG. 11A may be included in the 'EHT-MCS Map(BW=160 MHz)' sub-field and the 'EHT-MCS Map(BW=320 MHz)' sub-field and may be transmitted to the AP. In detail, information configured with a B63_1 bit and a B63_2 bit of FIG. 11A may be included in the 'EHT-MCS Map(BW=160 MHz)' sub-field, and information configured with a B63_3 bit and a B63_4 bit of FIG. 11A may be included in the 'EHT-MCS Map (BW=320 MHz)' sub-field.

Figure 15:
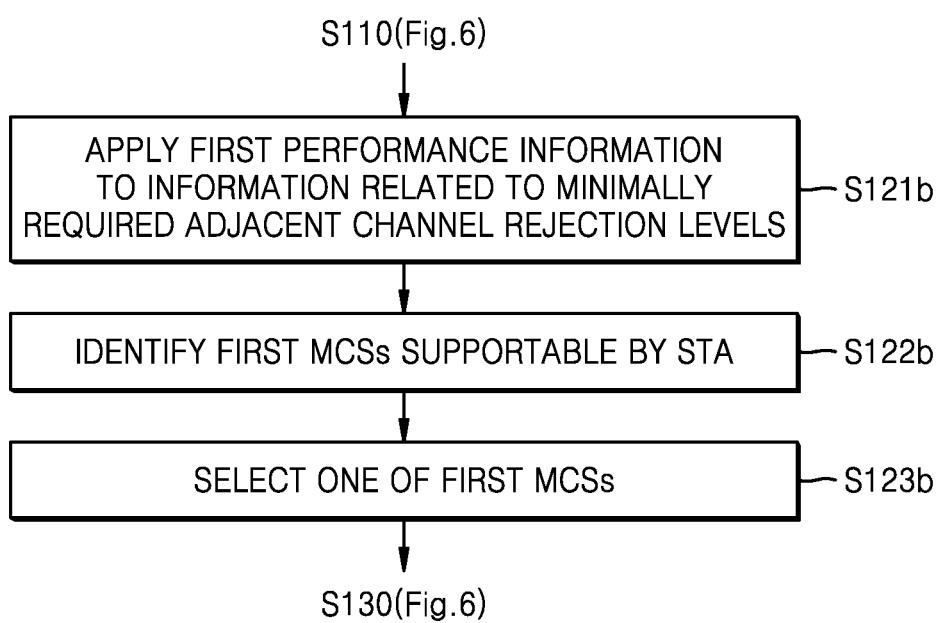
FIG. 15 is a flowchart of an embodiment of operation S120 of FIG. 6.

FIG. 15 is a flowchart of an embodiment of operation S120 of FIG. 6.

Referring to FIG. 15, in operation S121b following operation S110 of FIG. 6, the AP 410 may apply first performance information to information related to minimally required adjacent channel rejection levels. In operation S122b, the AP 410 may identify first MCSs supportable by the STA 420 in the wider bandwidth, based on a result of operation S121b. In operation S123b, the AP 410 may select one of the first MCSs to generate a PPDU allocated to the STA 420. Detailed descriptions of the embodiment of FIG. 15 are provided with reference to FIGS. 16A and 16B.

Figure 16A:
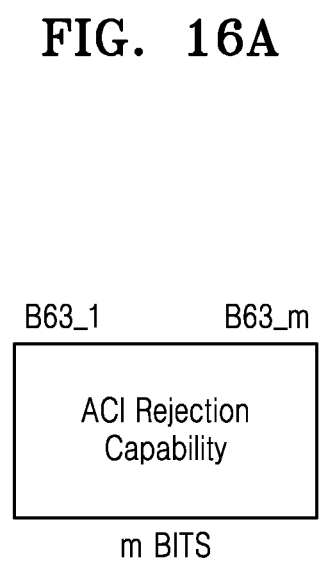

FIG. 16A is a view illustrating first performance information according to an embodiment, and FIG. 16B is a view for explaining the performance of a STA indicated by the first performance information of FIG. 16A.

Referring to FIG. 16A, the first performance information may include information indicating adjacent channel interference (ACI) rejection performance of the STA. The ACI rejection performance may be associated with information related to information related to minimally required adjacent channel rejection levels defined in IEEE P802.11be. The ACI rejection performance may be information indicating a rejection level additionally supported by the STA according to the performance of the STA.

Referring further to FIG. 16B, the minimally required adjacent channel rejection levels and non-adjacent channel rejection levels may be determined for each of MCS0 through MCS15, and the AP may perform an operation on the premise that the STA may support the minimally required adjacent channel rejection levels and the adjacent channel rejection levels corresponding to each of MCS0 through MCS15. In this case, the STA may transmit the first performance information indicating the ACI rejection performance to the AP so that the AP may perform an operation according to the performance of the STA.

For example, when the adjacent channel rejection level measured by the STA is −9 (dB) and the ACI rejection performance of the STA is −5 (dB), the AP may determine a final adjacent channel rejection level of the STA to be −14 (dB) to thereby identify the first MCSs supportable by the STA in the wider bandwidth. In other words, the AP may identify MCS0 through MCS11, MCS 14, and MCS 15 as the first MCSs.

Figure 17:
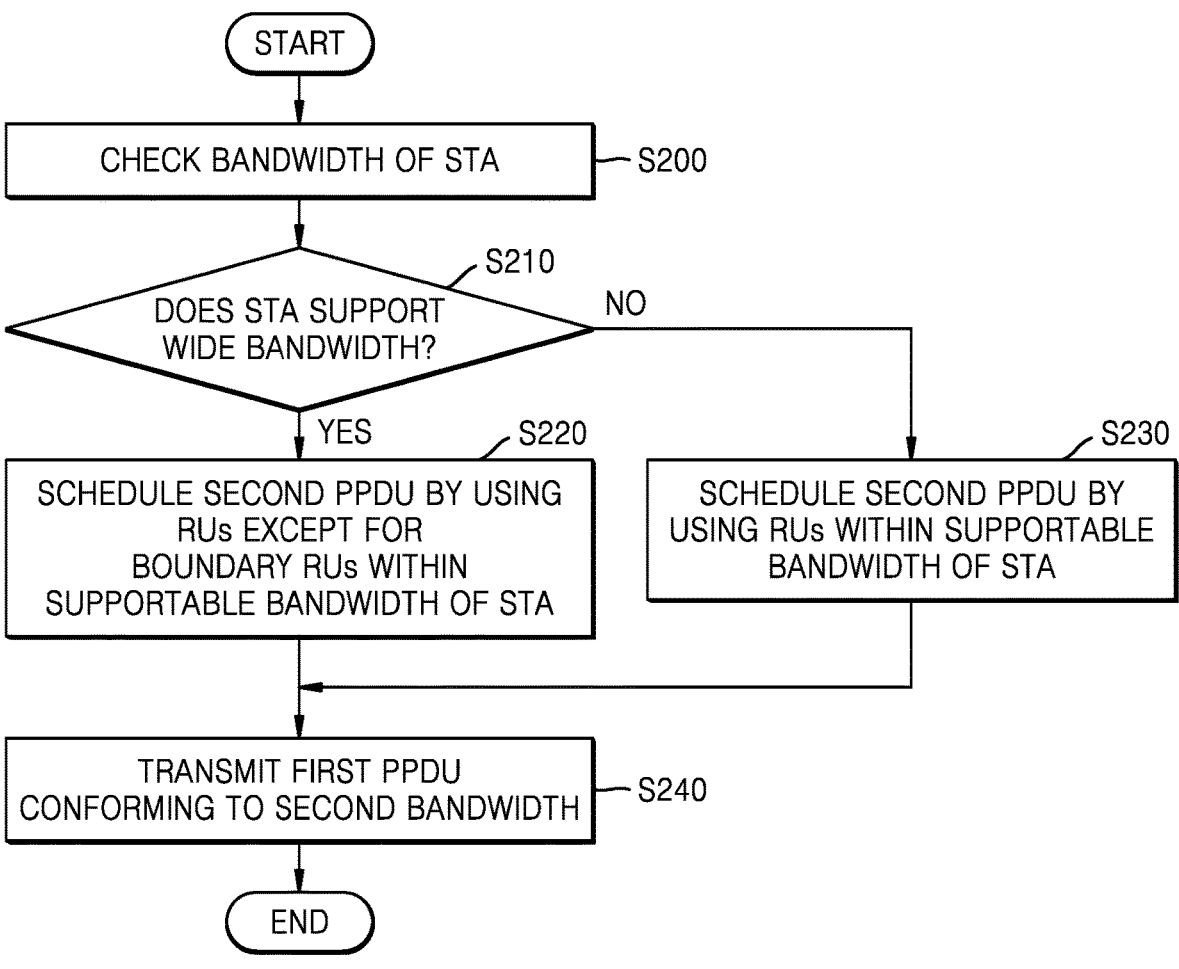
FIG. 17 is a flowchart of an operation method of an AP according to an embodiment.

FIG. 17 is a flowchart of an operation method of an AP according to an embodiment.

Referring to FIG. 17, in operation S200, the AP may check the bandwidth of a STA. In operation S210, the AP may determine whether the STA supports a wide bandwidth. In detail, the AP may receive, from the STA, second performance information indicating whether the STA supports a wide bandwidth, and may determine whether the STA supports the wide bandwidth, based on the second performance information. When operation S210 is 'YES', the AP may schedule the second PPDU allocated to the STA by using remaining RUs except for boundary RUs within a supportable bandwidth of the STA, in operation S220. When operation S210 is 'NO', the AP may schedule the second PPDU by using the RUs within the supportable bandwidth of the STA, in operation S230. In operation S240, the AP may include the second PPDU, and may transmit a first PPDU conforming to a second bandwidth.

Figure 18A:
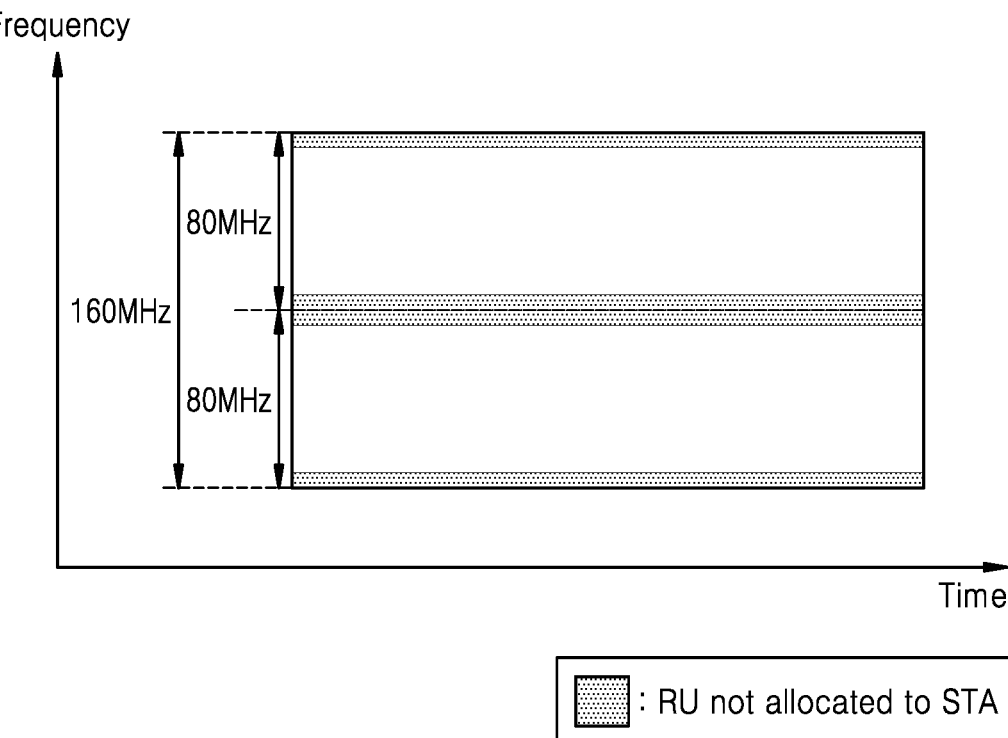
FIGS. 18A and 18B are views for explaining a method of scheduling a second PPDU allocated to a STA that supports a wider bandwidth of an AP, according to an embodiment.
Figure 18B:
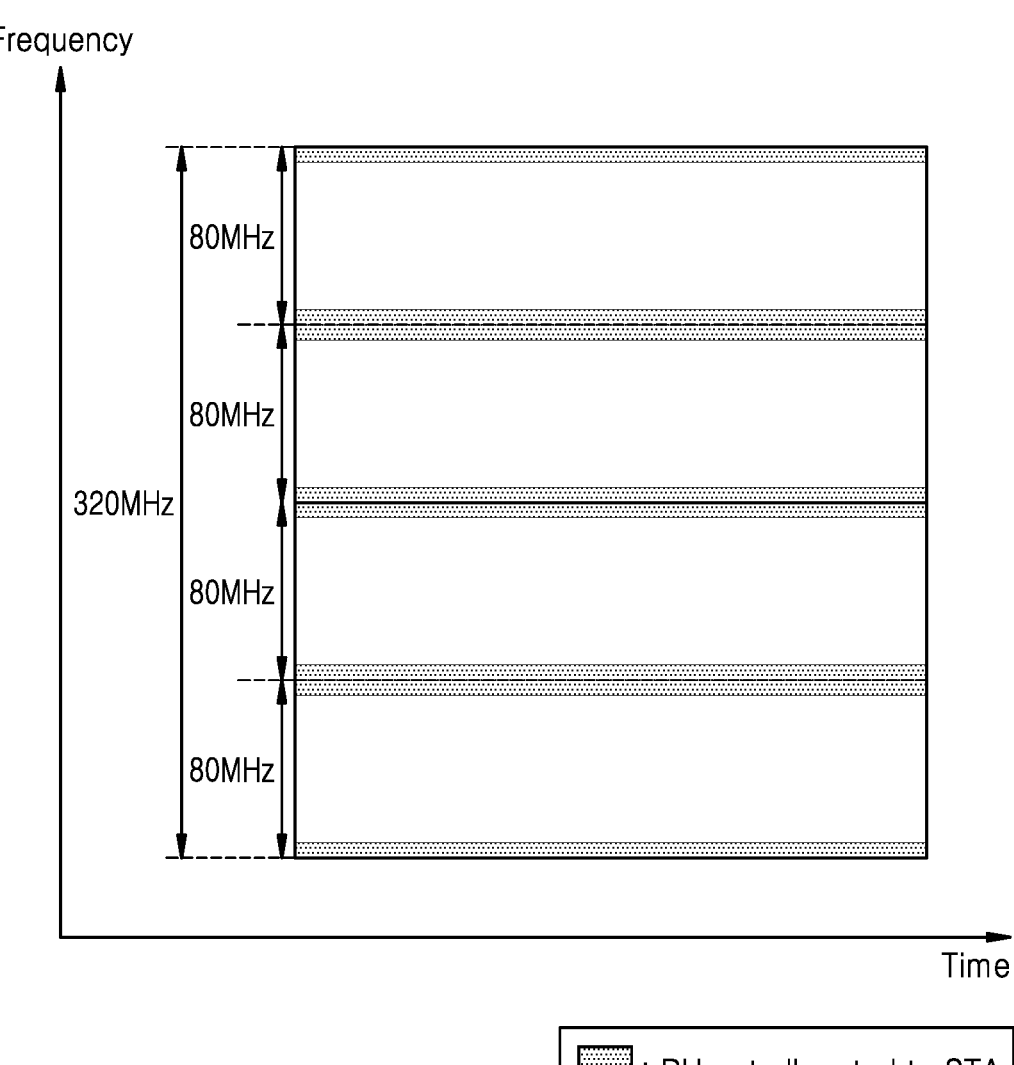

FIGS. 18A and 18B are views for explaining a method of scheduling a second PPDU allocated to a STA that supports a wider bandwidth of an AP, according to an embodiment. In FIGS. 18A and 18B, it is assumed that a first bandwidth supportable by the STA is 80 MHz.

Referring to FIG. 18A, the AP may schedule the second PPDU allocated to the STA so that, when the second PPDU allocated to the STA is included in a first PPDU conforming to a second bandwidth of 160 MHz, RUs located at the boundary of a band having a bandwidth of 80 MHz are not allocated to the STA. In other words, when the AP transmits the second PPDU allocated to the STA, the RUs located at the boundary of the band having a bandwidth of 80 MHz may not be used. For example, in the first PPDU conforming to the second bandwidth of 160 MHz, the AP may perform scheduling so that RU1, RU37, RU38 and RU74 among RUs having an RU size corresponding to 26-tone RU are not allocated to the STA. As another example, in the first PPDU conforming to the second bandwidth of 160 MHz, the AP may perform scheduling so that RU1, RU16, RU17 and RU32 among RUs having an RU size corresponding to 52-tone RU are not allocated to the STA. As another example, in the first PPDU conforming to the second bandwidth of 160 MHz, the AP may perform scheduling so that MRU1, MRU8, MRU9, and MRU16 among MRUs having an MRU size corresponding to (106+26)-tone multiple RU (MRU) are not allocated to the STA. As another example, in the first PPDU conforming to the second bandwidth of 160 MHz, the AP may perform scheduling so that MRU4, MRU5, MRU6, and MRU7 among MRUs having an MRU size corresponding to (484+242)-tone MRU are not allocated to the STA.

Referring further to FIG. 18B, the AP may schedule the second PPDU allocated to the STA so that, when the second PPDU allocated to the STA is included in a first PPDU conforming to a second bandwidth of 320 MHz, RUs located at the boundary of a band having a bandwidth of 80 MHz are not allocated to the STA. For example, in the first PPDU conforming to the second bandwidth of 320 MHz, the AP may perform scheduling so that RU1, RU37, RU38, RU74, RU75, RU111, RU112, and RU148 among the RUs having an RU size corresponding to 26-tone RU are not allocated to the STA. As another example, in the first PPDU conforming to the second bandwidth of 320 MHz, the AP may perform scheduling so that RU1, RU16, RU17, RU32, RU33, RU48, RU49, and RU64 among the RUs having an RU size corresponding to 52-tone RU are not allocated to the STA. As another example, in the first PPDU conforming to the second bandwidth of 320 MHz, the AP may perform scheduling so that MRU1, MRU8, MRU9, MRU16, MRU17, MRU24, MRU25, and MRU32 among the MRUs having an MRU size corresponding to (106+26)-tone MRU are not allocated to the STA. As another example, in the first PPDU conforming to the second bandwidth of 320 MHz, the AP may perform scheduling so that MRU2, MRU3, MRU4, MRU5, MRU6, MRU7, MRU10, MRU11, MRU12, MRU13, MRU14, and MRU15 among the MRUs having an MRU size corresponding to (484+242)-tone MRU are not allocated to the STA.

In FIGS. 18A and 18B, RUs excluded from being allocated to the STA may vary depending on the types of RUs constituting the second PPDU.

Figure 19:
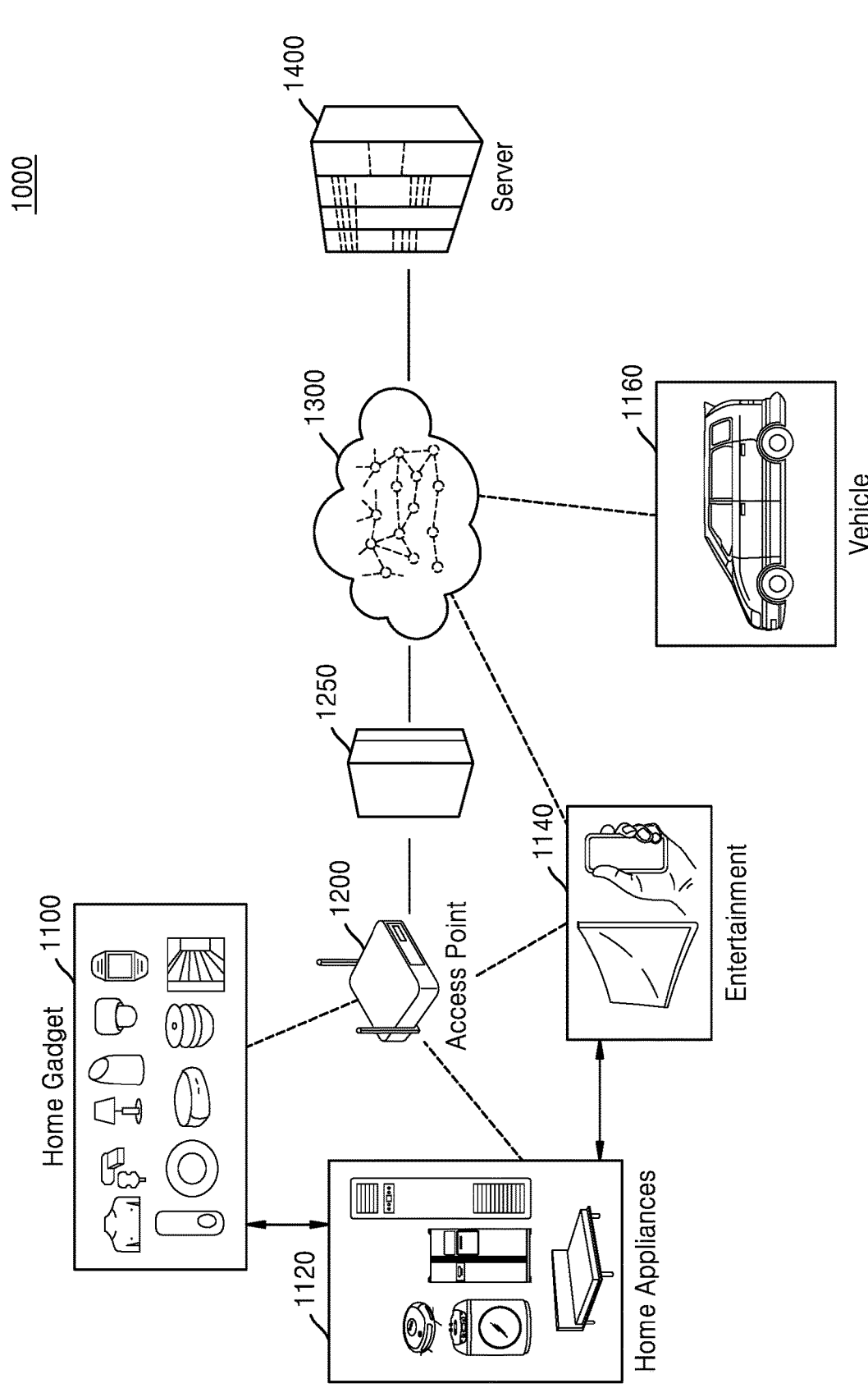
FIG. 19 is a conceptual diagram of an Internet of things (IoT) network system to which embodiments are applied.

FIG. 19 is a conceptual diagram of an Internet of things (IoT) network system 1000 to which embodiments are applied.

Referring to FIG. 14, the IoT network system 1000 may include a plurality of IoT devices. an AP 1200, a gateway 1250, a wireless network 1300, and a server 1400. IoT may refer to a network among things using wired/wireless communication.

The IoT devices may be grouped by the characteristics thereof. For example, the IoT devices may be divided into a group of home gadgets 1100, a group of home appliances/furniture 1120, a group of entertainment equipment 1140, and a group of vehicles 1160. The plurality of IoT devices, e.g., the home gadgets 1100, the home appliances/furniture 1120, and the group of entertainment equipment 1140, may be connected to a communication network or another IoT device through the AP 1200. The AP 1200 may be embedded in one IoT device. The gateway 1250 may change a protocol to allow the AP 1200 to access an external wireless network. The IoT devices, e.g., the home gadgets 1100, the home appliances/furniture 1120, and the group of entertainment equipment 1140, may be connected to an external communication network through the gateway 1250. The wireless network 1300 may include Internet and/or a public network. The plurality of IoT devices, e.g., the home gadgets 1100, the home appliances/furniture 1120, the group of entertainment equipment 1140, and the vehicles 1160, may be connected to the server 1400, which provides a certain service, through the wireless network 1300, and users may use the service through at least one of the IoT devices, e.g., the home gadgets 1100, the home appliances/furniture 1120, the group of entertainment equipment 1140, and the vehicles 1160.

According to an embodiment, the plurality of IoT devices, e.g., the home gadgets 1100, the home appliances/furniture 1120, the group of entertainment equipment 1140, and the vehicles 1160, may transmit and receive pieces of performance information in the wider bandwidth to and from one another, and may demodulate and transmit/receive signals, based on the pieces of performance information. Accordingly, the IoT devices, e.g., the home gadgets 1100, the home appliances/furniture 1120, the group of entertainment equipment 1140, and the vehicles 1160, may provide a high-quality service to a user by performing efficient and effective communication.

In embodiments described above, a hardware access method has been described as an example. However, other embodiments include a software-based access method. Further, various functions described hereinabove may be implemented or supported by artificial intelligence technology or one or more computer programs, where each of the programs is formed of computer-readable program code and executed in a computer-readable recording medium. "An application" and "a program" refer to one or more computer programs, software components, instruction sets, processes, functions, objects, classes, instances, related data, or parts thereof suitable for implementation of pieces of computer-readable program code. "Computer-readable program code" includes all types of computer code including source code, object code, and execution code. "Computer-readable media" include all types of media that may be accessed by a computer, such as read only memory (ROM), random access memory (RAM), a hard disk drive, a compact disk (CD), a digital video disk (DVD), and other types of memory. "Non-transitory" computer-readable media exclude wired, wireless, optical, or other communication links transmitting temporary electrical or other signals. Non-transitory computer-readable media include a medium in which data may be permanently stored and a medium in which data may be stored and may be overwritten later such as a rewritable optical disk or a deletable memory device.

While the inventive concept has been particularly shown and described with reference to embodiments thereof, it will be understood that various changes in form and details may be made therein without departing from the spirit and scope of the following claims.

What is claimed is:

1. A station (STA) that communicates with an access point (AP) in a Wireless Local Area Network (WLAN) system, the STA comprising:

a transceiver configured to support transmission and reception of signals within a first bandwidth; and processing circuitry configured to support a wider bandwidth than the first bandwidth by obtaining at least one resource unit corresponding to the first bandwidth from a physical layer protocol data unit (PPDU) conforming to the wider bandwidth, wherein the processing circuitry is configured to control the transceiver to transmit, to the AP, a signal including a capabilities information field, and wherein the capabilities information field comprises a first performance information subfield indicating whether a first modulation scheme is supported in the wider bandwidth according to a capability of the STA, and a second performance information subfield indicating whether a second modulation scheme is supported in the wider bandwidth according to the capability of the STA.

2. The STA of claim 1, wherein data mapped to the at least one resource unit corresponding to the first bandwidth, is modulated according to either the first modulation scheme or the second modulation scheme.

3. The STA of claim 1, wherein the first modulation scheme corresponds to one of 16-QAM (quadrature amplitude modulation), 64-QAM, 256-QAM, 1024-QAM, and 4096-QAM, and wherein the second modulation scheme corresponds to a different one of 16-QAM, 64-QAM, 256-QAM, 1024-QAM, and 4096-QAM.

4. The STA of claim 1, wherein the capability of the STA relates to sharpness of a decimation filter used when the processing circuitry obtains the at least one resource unit.

5. The STA of claim 1, wherein the signal further includes information indicating whether the wider bandwidth is supported.

6. The STA of claim 1, wherein the first performance information subfield comprises a bit indicating whether the first modulation scheme is supported.

7. The STA of claim 1, wherein the second performance information subfield comprises a bit indicating whether the second modulation scheme is supported.

8. An access point (AP) for communicating with a station (STA) that supports transmission and reception at least within a first bandwidth defined by a legacy Wireless Local Area Network (WLAN) protocol in a WLAN system, the AP comprising:

a transceiver configured to receive, from the STA, a signal including a capabilities information field, wherein the capabilities information field comprises a first performance information subfield indicating whether a first modulation scheme, among a plurality of modulation schemes, is supported in a wider bandwidth than the first bandwidth according to a capability of the STA, and a second performance information subfield indicating whether a second modulation scheme is supported in the wider bandwidth according to the capability of the STA, and the transceiver configured to transmit a physical layer protocol data unit (PPDU) to the STA; and processing circuitry configured to select one modulation scheme from the first and second modulation schemes, based on the signal and a channel state with the STA.

9. An operation method of a station (STA) for communicating with an access point (AP) in a Wireless Local Area Network (WLAN) system, the operation method comprising:

transmitting, to the AP, a signal including a capabilities information field, wherein the capabilities information field comprises a first performance information subfield indicating whether a first modulation scheme is supported in a wider bandwidth than a first bandwidth according to a capability of the STA, and a second performance information subfield indicating whether a second modulation scheme is supported in the wider bandwidth according to the capability of the STA; and receiving, from the AP, a physical layer protocol data unit (PPDU), conforming to the wider bandwidth, wherein, in the PPDU, data corresponding to the first bandwidth allocated to the STA within the wider bandwidth is modulated according to either the first modulation scheme or the second modulation scheme.

10. The operation method of claim 9, further comprising obtaining the data, wherein the obtaining the data comprises sampling, filtering, and down-sampling the PPDU by using at least one sampling rate determined according to a ratio between the first bandwidth and the wider bandwidth and at least one decimation filter.

11. The AP of claim 8, wherein the capability of the STA relates to sharpness of a decimation filter included in the STA.

12. The AP of claim 8, wherein the signal further includes information indicating whether the wider bandwidth is supported.

13. The AP of claim 8, wherein the first performance information subfield comprises a bit indicating whether the first modulation scheme is supported.

14. The AP of claim 8, wherein the second performance information subfield comprises a bit indicating whether the second modulation scheme is supported.

15. The AP of claim 8, wherein the first modulation scheme corresponds to one of 16-QAM (quadrature amplitude modulation), 64-QAM, 256-QAM, 1024-QAM, and 4096-QAM, and wherein the second modulation scheme corresponds to a different one of 16-QAM, 64-QAM, 256-QAM, 1024-QAM, and 4096-QAM.

* * * * *